(12) United States Patent
Cho et al.

(10) Patent No.: US 8,273,310 B2
(45) Date of Patent: Sep. 25, 2012

(54) CENTRIFUGAL FORCE-BASED MICROFLUIDIC DEVICE FOR NUCLEIC ACID EXTRACTION AND MICROFLUIDIC SYSTEM INCLUDING THE MICROFLUIDIC DEVICE

(75) Inventors: Yoon-kyoung Cho, Suwon-si (KR); Jeong-gun Lee, Seoul (KR); Beom-seok Lee, Yongin-si (KR); Jong-myeon Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1149 days.

(21) Appl. No.: 11/848,748

(22) Filed: Aug. 31, 2007

(65) Prior Publication Data

US 2008/0108120 A1    May 8, 2008

(30) Foreign Application Priority Data

Sep. 5, 2006  (KR) .................. 10-2006-0085371
Dec. 8, 2006  (KR) .................. 10-2006-0125084

(51) Int. Cl.
*B04B 13/00*  (2006.01)

(52) U.S. Cl. .......... 422/506; 422/68.1; 422/50; 422/72; 422/502; 422/503; 422/507; 435/173.7; 435/283.1

(58) Field of Classification Search ............... 366/182.1, 366/220; 137/74, 803, 825; 204/666, 557, 204/664; 424/9.32; 494/84, 23, 49; 210/512.1, 210/223; 506/26; 422/501, 502, 503, 504, 422/505, 506, 507, 508, 509, 72, 68.1, 61, 422/65, 99, 100, 101, 102, 103, 186; 435/286, 435/287

See application file for complete search history.

(56) References Cited

U.S. PATENT DOCUMENTS

| | | | |
|---|---|---|---|
| 2001/0055812 A1* | 12/2001 | Mian et al. ...................... | 422/72 |
| 2002/0068821 A1* | 6/2002 | Gundling .......................... | 435/6 |
| 2003/0156991 A1* | 8/2003 | Halas et al. ................... | 422/100 |

FOREIGN PATENT DOCUMENTS

| | | |
|---|---|---|
| EP | 0605003 A2 | 7/1994 |
| EP | 1650297 A2 | 4/2006 |
| EP | 1655366 A2 | 5/2006 |
| EP | 1662008 A2 | 5/2006 |

OTHER PUBLICATIONS

Pitsillides Costas M et al: "Selective cell targeting with light-absorbing microparticles and nanoparticles." Biophysical Journal, vol. 84, No. 6, Jun. 2003, pp. 4023-4032.

(Continued)

*Primary Examiner* — In Suk Bullock
*Assistant Examiner* — Sharon Pregler
(74) *Attorney, Agent, or Firm* — Sughrue Mion, PLLC

(57) ABSTRACT

A centrifugal force-based microfluidic device for nucleic acid extraction and a microfluidic system are provided. The microfluidic device includes a body of revolution; a microfluidic structure disposed in the body of revolution, the microfluidic structure including a plurality of chambers, channels connecting the chambers, and valves disposed in the channels to control fluid flow, the microfluidic structure transmitting the fluid using centrifugal force due to rotation of the body of revolution; and magnetic beads contained in one of the chambers which collect a target material from a biomaterial sample flowing into the chamber, wherein the microfluidic structure washes the magnetic beads which collect the target material, and separates nucleic acid by electromagnetic wave irradiation from an external energy source to the magnetic beads. The microfluidic system includes the microfluidic device; a rotation operating unit which rotates the body of revolution; and an external energy source which irradiates electromagnetic waves.

20 Claims, 17 Drawing Sheets

OTHER PUBLICATIONS

Hoffmann O et al: "Laser Based Disruption of Bacillus Spores on a Microchip" Special Publication—Royal Society of Chemistry, Royal Society of Chemistry, London, GB, 2005, pp. 258-260.

Becquart et al: "Quantitation of HIV-1 RNA in breast milk by real time PCR" Journal of Virological Methods, Amsterdam, NL, vol. 133, No. 1, Apr. 1, 2006, pp. 109-111.

* cited by examiner

BEADS ARE MIXED WITH SERUM:
TARGET PATHOGEN IS CAPTURED ON BEADS SURFACES

BEADS ARE SEDIMENTED
ON THE BOTTOM PART

OPEN VALVE    SERUM RESIDUE
              IN WASTE CHAMBER

CLOSE THE CHANNEL
BY HEATING THE CLOSING VALVE

FIG. 15I

OPEN VALVE

WASHING BUFFER IS MOVED
TO MIXING CHAMBER

FIG. 15J

MAGNET

BEADS TRAPED   OPEN VALVE
IN LYSIS CHAMBER

CENTRIFUGAL FORCE-BASED MICROFLUIDIC DEVICE FOR NUCLEIC ACID EXTRACTION AND MICROFLUIDIC SYSTEM INCLUDING THE MICROFLUIDIC DEVICE

CROSS-REFERENCE TO RELATED PATENT APPLICATIONS

This application claims priority from Korean Patent Application No. 10-2006-0085371, filed on Sep. 5, 2006, and Korean Patent Application No. 10-2006-0125084, filed on 8 Dec., 2006, in the Korean Intellectual Property Office, the disclosures of which are incorporated herein in their entirety by reference.

BACKGROUND OF THE INVENTION

1. Field of the Invention

Apparatuses and methods consistent with the present invention relate to a centrifugal force-based microfluidic device which controls fluid flow by centrifugal force in a microfluidic structure prepared on a body of revolution, and more particularly, to a centrifugal force-based microfluidic device for extracting nucleic acid of a target cell or a virus from a biological sample.

2. Description of the Related Art

In general, a microfluidic structure constituting a microfluidic device may include a plurality of elementary units, such as a chamber, a channel, a valve, and various functional units, wherein the chamber stores a small amount of fluid, the fluid flows through the channel, the valve controls fluid flow, and the functional units receive the fluid to perform predetermined functions. This microfluidic structure, which is formed on a chip-type substrate for conducting experiments including a biochemical reaction, is referred to as a bio-chip. In particular, a device manufactured to perform several steps of processes and operations in one chip is referred to as a lab-on-a-chip.

In order to transfer fluid in the microfluidic structure, driving pressure is needed. Capillary pressure or pressure by an additional pump may be used as the driving pressure. Recently, a centrifugal force-based microfluidic device in which a microfluidic structure is disposed on a compact disk-type body of revolution has been suggested. Such a device is referred to as a lab-on-a CD or a Lab CD. However, in this case, since a body of revolution is not fixed onto a frame and thus moves, it is difficult to control fluid flow and temperature of elementary units in the body of revolution.

SUMMARY OF THE INVENTION

The present invention provides a centrifugal force-based microfluidic device for nucleic acid extraction and a microfluidic system including the microfluidic device, wherein the microfluidic device can extract nucleic acid that is adequate for performing a Polymerase Chain Reaction (PCR), through a series of processes performed in the microfluidic structure such as separating and concentrating a specific target material from a biomaterial sample and dissolving the separated target material when the biomaterial sample is injected into the microfluidic structure prepared on a body of revolution in which centrifugal force has an influence and wherein the microfluidic system includes the microfluidic device and devices to operate the microfluidic device.

According to an aspect of the present invention, there is provided a centrifugal force-based microfluidic device for nucleic acid extraction, including: a body of revolution; a microfluidic structure disposed in the body of revolution, each including a plurality of chambers, channels connecting the chambers, and valves disposed in the channels to control fluid flow, the microfluidic structure transmitting the fluid using centrifugal force due to rotation of the body of revolution; and micro-particles contained in one of the chambers, which collect a target material from a biomaterial sample flowing into the chamber, wherein the microfluidic structure wash the micro-particles having the target material collected thereon and separate nucleic acid by electromagnetic wave irradiation from an external energy source into the micro-particles. The target material may be a bio material including a cell or a virus.

Here, each of the valves may be at least one of a capillary valve, a hydrophobic valve, a mechanical valve, and a phase-change valve.

The phase-change valve may include a valve plug including heat generating particles and phase-change materials, the heat generating particles absorbing radiation energy from an external energy source and the phase-change materials melting by heat generated from the heat generating particles, and control flow of fluid, the fluid passing through the channels according to a position of the valve plug in the channels.

The micro-particles may have surfaces modified with an antibody or a metal oxide having affinity for a target cell or virus, and the metal oxide may be at least one of $Al_2O_3$, $TiO_2$, $Ta_2O_3$, $Fe_2O_3$, $Fe_3O_4$, and $HfO_2$. In addition, the micro-particles may include at least one of Fe, Ni, Cr, an Fe oxide, an Ni oxide and a Cr oxide.

According to another aspect of the present invention, there is provided a microfluidic device including: a body of revolution; and a microfluidic structure disposed in the body of revolution, each comprising a plurality of chambers, channels connecting the chambers and valves disposed in the channels to control fluid flow, the microfluidic structure transmitting the fluid using centrifugal force due to rotation of the body of revolution. The micro-particles contained in one of the chambers can collect a target material from a biomaterial sample flowing into the chamber. The microfluidic structure comprises: a sample chamber which contains samples; a buffer chamber which contains a buffer solution; and a mixing chamber which is connected with the sample chamber and the buffer chamber to contain the micro-particles, samples, and the buffer solution, respectively. The samples and the buffer solution flow into the mixing chamber by control of valves disposed in each channel. The mixing chamber comprises an outlet having a valve at the most distant position from the center of the body of revolution, and in the mixing chamber, a reaction of the micro-particles and the sample solution and the washing of the micro-particles using the buffer solution may be performed. The microfluidic structure further comprises a waste chamber connected with the closer part from the center of the body of revolution than the outlet of the mixing chamber through a channel. The waste chamber contains the fluid discharged from the mixing chamber by control of the valve disposed in the channel. The microfluidic structure also comprises a cytolysis chamber connected with the outlet of the mixing chamber through a channel, wherein the cytolysis chamber contains the fluid comprising the micro-particles discharged from the outlet of the mixing chamber.

The mixing chamber may be disposed further away from the center of the body of revolution than the sample chamber and the buffer chamber and is disposed closer to the center of the body of revolution than the waste chamber and the cytolysis chamber.

The channel connecting the buffer chamber with the mixing chamber may be connected to the adjacent part of the outlet of the mixing chamber.

The microfluidic device may further include a micro-particle chamber disposed closer to the center of the body of revolution than the mixing chamber, and connected with the mixing chamber to provide the micro-particles to the mixing chamber. In this case, the microfluidic device may further include a valve disposed in a channel, the channel connecting the micro-particle chamber and the mixing chamber.

The cytolysis chamber may collect the micro-particles among the fluid flowing into the cytolysis chamber and discharge the remaining fluid through an outlet thereof. The outlet of the cytolysis chamber may be extended toward the center of the body of revolution and stores the micro-particles having higher density than the fluid in the cytolysis chamber due to centrifugal force.

The microfluidic device may further include magnetic field forming materials disposed near the cytolysis chamber to collect the micro-particles in the cytolysis chamber due to magnetic force when the micro-particles are magnetic beads.

In addition, the microfluidic device may further include a centrifuging unit connected with a channel, the channel connecting with the sample chamber and the mixing chamber, wherein the centrifuging unit centrifuges the sample contained in the sample chamber and provides a predetermined amount of the sample through the channel. The centrifuging unit may separate whole blood into, for example, blood cells and plasma, and provide the separated plasma to the mixing chamber as the sample.

In the microfluidic device, the valves may comprise at least one of a capillary valve, a hydrophobic valve, a mechanical valve, and a phase-change valve.

The phase-change valve may include a valve plug including heat generating particles and phase-change materials, the heat generating particles absorbing radiation energy from an external device and the phase-change materials melting by heat generated from the heat generating particles, and controls flow of fluid, the fluid passing through the channels, according to a position of the valve plug in the channels.

The phase-change valve may include an opening valve which is disposed for the valve plug to close the channel at an initial stage and moves to a space which is adjacent to the initial position of the valve plug prepared after the valve plug is melted by heat, to open the channel. In addition, the phase-change valve may include a closing valve which is disposed in a valve chamber connecting with the channel for the valve plug to open the channel at an initial stage, wherein the valve plug flows into the channel after the valve plug is melted and expanded by heat, to close the channel.

The micro-particles may have surfaces modified with an antibody or a metal oxide having affinity for a target cell or virus. The metal oxide may comprise at least one of $Al_2O_3$, $TiO_2$, $Ta_2O_3$, $Fe_2O_3$, $Fe_3O_4$, and $HfO_2$. The micro-particles may include at least one of Fe, Ni, Cr, an Fe oxide, an Ni oxide and a Cr oxide.

According to another aspect of the present invention, there is provided a microfluidic system including: a microfluidic device comprising a body of revolution, a microfluidic structure disposed in the body of revolution, each comprising a plurality of chambers, channels connecting the chambers and valves disposed in the channels to control fluid flow, the microfluidic structure transmitting the fluid using centrifugal force due to rotation of the body of revolution, and micro-particles contained in any one of the chambers which selectively collect target materials from biomaterial samples flowing into the chamber; a rotation operating unit which rotates the body of revolution of the microfluidic device; and an external energy source which irradiates electromagnetic waves onto the micro-particles having collected target materials, wherein the microfluidic device washes and separates the micro-particles having collected the target material and separates nucleic acid by electromagnetic wave irradiation from an external energy source to the micro-particles.

The valves may comprise at least one of a capillary valve, a hydrophobic valve, a mechanical valve, and a phase-change valve. The phase-change valve may include a valve plug including heat generating particles and phase-change materials, the heat generating particles absorbing radiation energy from an external energy source and the phase-change materials melting by heat generated from the heat generating particles, and control flow of fluid, the fluid passing through the channels, according to a position of the valve plug in the channels.

When the microfluidic device include a plurality of phase-change valves each comprising a valve plug comprising heat generating particles and phase-change materials, the heat generating particles absorbing radiation energy from an external energy source and the phase-change materials melting by heat generated from the heat generating particles, and the valves controlling flow of fluid, and the fluid passing through the channels, according to a position of the valve plug in the channels, the microfluidic system may further include an external energy source adjusting means which adjusts position or direction of the external energy source for the electromagnetic waves to reach the region including an phase-change valve selected among a plurality of phase-change valves.

Here, the rotation operating unit may include a motor to control rotation speed and rotation angle of the body of revolution. The external energy source adjusting means may include a rectilinearly moving means for the external energy source disposed facing the body of revolution to move in a radial direction of the body of revolution. The external energy source may include a laser light source which emits a laser beam. The external energy source adjusting means may include at least one reflector which reflects laser beam emitted from the laser light source, and a reflector operating unit which adjusts an angle of the reflector and changes the route of laser beam.

The micro-particles may have surfaces modified with an antibody or metal oxide having affinity for target cells or viruses. The metal oxide may be at least one of $Al_2O_3$, $TiO_2$, $Ta_2O_3$, $Fe_2O_3$, $Fe_3O_4$, and $HfO_2$. The micro-particles may include at least one of Fe, Ni, Cr, an Fe oxide, an Ni oxide and a Cr oxide.

According to another aspect of the present invention, there is provided a microfluidic system including: the microfluidic device according to an exemplary embodiment of the present invention described above (including the sample chamber, the buffer chamber, the mixing chamber, the waste chamber, and the cytolysis chamber); a rotation operating unit which operates the body of revolution of the microfluidic device; and an external energy source which irradiates a laser beam onto the cytolysis chamber for laser ablation.

Here, each element of the microfluidic device may have features described above. In addition, when the microfluidic device include a plurality of phase-change valves each comprising a valve plug comprising heat generating particles and phase-change materials, the heat generating particles absorbing radiation energy from an external device and the phase-change materials melting by heat generated from the heat generating particles, and controlling flow of fluid, and the fluid passing through the channels, according to a position of the valve plug in the channels, the microfluidic system may further include an external energy source adjusting means which adjusts position or direction of the external energy source for the electromagnetic waves to reach the region including an phase-change valve selected among a plurality of phase-change valves.

Here, the rotation operating unit may include a motor to control rotation speed and rotation angle of the body of revolution. The external energy source adjusting means may include a rectilinearly moving means for the external energy source disposed facing the body of revolution to move in a radial direction of the body of revolution. The external energy source adjusting means may include at least one reflector which reflects laser beam emitted from the laser light source, and a reflector operating unit which adjusts an angle of the reflector and changes the route of laser beam.

According to another aspect of the present invention, there is provided a method of extracting nucleic acid of a target material using the microfluidic device, the method including: transmitting a sample contained in a sample chamber to a mixing chamber containing micro-particles; mixing the micro-particles with the sample in the mixing chamber to capture the target material on the surfaces of the micro-particles; centrifuging the mixed solution of the micro-particles and the sample to discharge supernatant to a waste chamber; transmitting a buffer solution contained in a buffer chamber to the mixing chamber to wash the micro-particles and transmitting the mixed fluid of the micro-particles and the buffer solution to separate the micro-particles in the cytolysis chamber; and cytolyzing the target material captured on the surfaces of the micro-particles by irradiating electromagnetic waves onto the cytolysis chamber from an external energy source.

BRIEF DESCRIPTION OF THE DRAWINGS

The above and other aspects of the present invention will become more apparent by describing in detail exemplary embodiments thereof with reference to the attached drawings, in which:

FIGS. 15A through 15K are photographic images illustrating a process of extracting DNA of Hepatitis B virus (HBV) extracted from blood samples using the microfluidic device of FIG. 4, according to an exemplary embodiment of the present invention;

DETAILED DESCRIPTION OF EXEMPLARY EMBODIMENTS

Hereinafter, the present invention will be described more fully with reference to the accompanying drawings, in which exemplary embodiments of the invention are shown.

Figure 1:
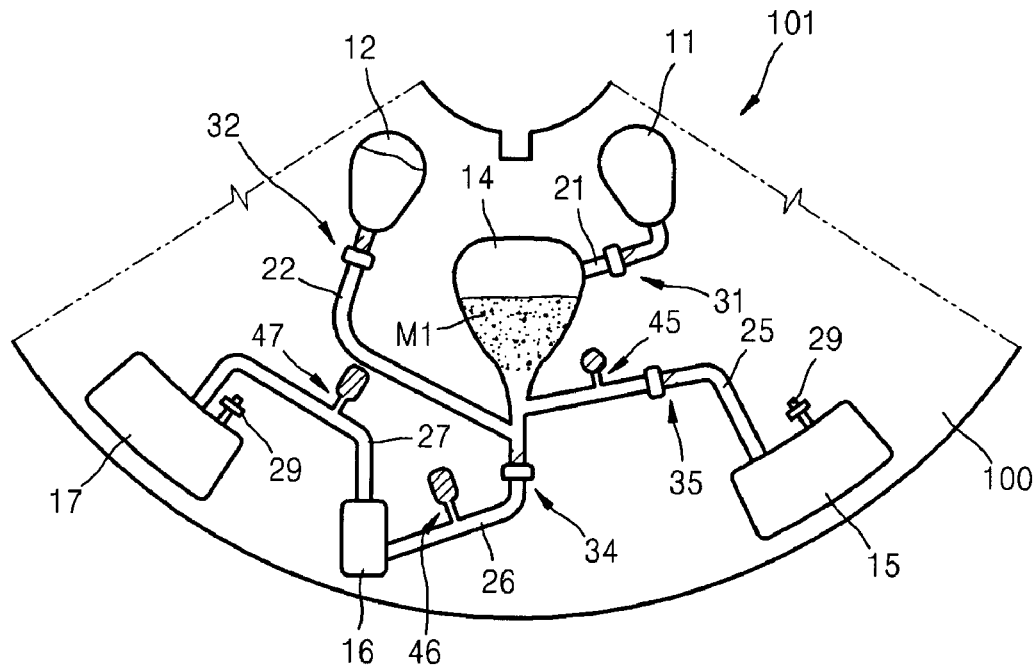
FIG. 1 is a plan view schematically illustrating a microfluidic device for nucleic acid extraction according to an exemplary embodiment of the present invention.

FIG. 1 is a plan view schematically illustrating a microfluidic device 101 for nucleic acid extraction according to an exemplary embodiment of the present invention.

Referring to FIG. 1, the microfluidic device 101 according to the current exemplary embodiment of the present invention has a symmetric shape and includes a disk-shaped body of revolution 100. The body of revolution 100 may include one or more microfluidic structures. For example, the body of revolution 100 may be divided into a plurality of fan-shaped regions and a microfluidic structure can be prepared on each region. FIG. 1 illustrates one section of the body of revolution 100 on which a microfluidic structure is prepared. The upper part and lower part of the section of the body of revolution 100 of FIG. 1 is a center part and an outer part of the body of revolution 100, respectively.

The microfluidic structure prepared on the body of revolution 100 includes a number of chambers, channels through which the chambers are connected, and valves through which fluid flow is controlled. Such microfluidic structures are configured such that one structure is stacked on top of another structure, and are provided in a three-dimensional pattern formed on one of two disks. Here, the three dimensional pattern may be formed on a surface of one disk facing the other disk, and the two disks constitute the body of revolution 100. The upper disk of the two disks may be formed of a transparent material in order to allow easy detection of flow and reaction of the fluid. A method of manufacturing the microfluidic structure is well known in the field of the present invention.

In the microfluidic device 101 according to the current exemplary embodiment of the present invention, the microfluidic structure is formed as follows. The microfluidic structure includes a sample chamber 11 and a buffer chamber 12, wherein the sample chamber 11 contains a fluid sample and the buffer chamber 12 contains a buffer solution. Each of the sample chamber 11 and the buffer chamber 12 include an inlet (not illustrated) through which samples and a proper buffer solution can be injected.

A mixing chamber 14 is disposed further away from the center of the body of revolution 100 than the sample chamber 11 and the buffer chamber 12, and is connected with the sample chamber 11 and the buffer chamber 12 through channels 21 and 22, respectively, wherein the channels 21 and 22 are fluid transfer passages. Valves 31 and 32, which control fluid flow, are disposed in the channels 21 and 22, respectively. The mixing chamber 14 has an outlet in the portion of the mixing chamber 14 furthest from the center of the body of revolution 100, wherein the outlet includes a valve 34. The cross section of the mixing chamber 14 may be narrower at the section of the mixing chamber 14 near the outer part of the body of revolution 100 than that of the section of the mixing chamber 14 near the center of the body of revolution 100. In this case, a portion of the mixing chamber 14 near the outlet valve 34 can be formed in a channel shape. Meanwhile, the channel 22 which connects the buffer chamber 12 with the mixing chamber 14 may be connected with the outlet of the mixing chamber 14. The mixing chamber 14 contains micro-particles M1, which are injected in advance. In addition, a fluid sample and a buffer solution may be provided to the mixing chamber 14 from the sample chamber 11 and the buffer chamber 12, respectively.

A waste chamber 15 is disposed further away from the center of the body of revolution 100 than the mixing chamber 14. The waste chamber 15 can be connected with the outlet of the mixing chamber 14, that has a narrow cross-section of the mixing chamber 14 described above, through a channel 25. In this case, the space between a portion where the channel 25 is connected with the outlet of the mixing chamber 14 and the outlet valve 34 should be sufficient to collect the micro-particles M1 contained in the mixing chamber 14. In the channel 25, which is connected with the waste chamber 15, valves 35 and 45 to control flow of the fluid are also disposed.

On the other hand, a cytolysis chamber 16 is disposed further away from the center of the body of revolution 100 than the outlet of the mixing chamber 14. The cytolysis chamber 16 includes an inlet which is connected with the outlet of the mixing chamber 14 through a channel 26. The outlet of the cytolysis chamber 16 may be extended toward the center of the body of revolution 100. In this case, the micro-particles M1 flowing into the inlet of the cytolysis chamber 16 can be stored in the cytolysis chamber 16 due to centrifugal force. The outlet of the cytolysis chamber 16 is connected with a channel 27 and thus is connected with another waste chamber 17 through the channel 27. The channels 26 and 27, which are connected with the inlet and the outlet of the cytolysis chamber 16, respectively, include valves 46 and 47 so as to contain fluid including concentrated micro-particles M1 in the cytolysis chamber 16.

The two waste chambers 15 and 17 may have an exhaust pipe 29 to exhaust the fluid flowing into the waste chambers 15 and 17. This exhaust pipe 29 can be included in other chambers described above.

The cytolysis chamber 16 stores the micro-particles M1 having target cells or viruses captured thereon, and, then, a cytolysis operation such as radiating electromagnetic waves from the outside, for example, laser ablation, is performed at the cytolysis chamber 16. A quick cytolysis operation using electromagnetic waves and micro-particles is performed by heating and ablating by electromagnetic waves at a liquid culture medium. The electromagnetic waves supply energy to micro-particles so as to supply heat to the cells adhered onto the micro-particles, and apply physical and mechanical impact to the micro-particles simultaneously, thereby disrupting cells.

One of the advantages of the cytolysis using micro-particles and electromagnetic waves is that a nucleic acid separating operation can be shortened because such cytolysis accompanies protein denaturation. Since denatured protein and cell debris are adhered onto the micro-particles again, such micro-particles can be separated from nucleic acid extracted solution by gravity, centrifugal force, or magnetic force. Therefore, as the detection limit of target materials is lowered and a nucleic acid separating operation is shortened, the nucleic acid separating time is significantly decreased. In addition, as a signal amplitude increases, an analysis using a Polymerase Chain Reaction (PCR) is significantly improved. The time required to disrupt cells using electromagnetic waves and micro-particles may be 30 to 40 seconds.

Laser ablation generally indicates a phenomenon generated in a material which is exposed to a laser beam. The temperature of the surface of the material rapidly increases to hundreds to thousands of degrees. In addition, when the temperature of the surface of the material increases above a vaporization point, a liquid state material is vaporized, and saturated vapor pressure at the surface thereof is also rapidly increased. The saturated vapor pressure is expressed as a function of a temperature by a Clausius-Clapeyron equation. In addition, in the case of a high power pulse laser process, the saturated vapor pressure generally increases to several tens of atmospheric pressure. The pressure exerted on a surface of a material due to steam vapor with a steam vapor jet is referred to as repulsion pressure. When vapor pressure is $P_{sat}$, the size of the repulsion pressure is approximately 0.56 $P_{sat}$.

An impulse wave is generally generated in a laser machining process having significantly high instantaneous intensity such as a pulse laser. The pressure of steam vapor generated from a surface of a material, wherein the surface of the material is heated above a vaporization point in a very short time of nanoseconds or several tens nanoseconds, increases by a few to several tens of atmospheric pressure, and is expanded in the atmosphere to form an impulse wave. In steam vapor expanding due to significantly high pressure, a pressure of about 0.56 $P_{sat}$ has an influence on the material (here, $P_{sat}$ is saturated vapor pressure on the surface).

The laser may be a pulse laser or a continuous wave laser. At very low laser power, laser ablation cannot be efficiently performed. In the case of a continuous wave laser, laser power may be 10 mW or above, and in the case of a pulse laser, laser power may be 1 mJ/pulse or above. For example, the pulse laser may emit 3 mJ/pulse or above, and the continuous wave laser may emit 100 mW or above. When the continuous wave laser emits 10 mW or below and the pulse laser emits 1 mJ/pulse or below, energy that is sufficient for disrupting cells is not transmitted.

When cytolysis by laser ablation is performed, a laser generated from a specific wavelength band is used, wherein the wavelength band is absorbed by micro-particles. The laser may be generated from a wavelength band of 400 nm or above, for example, 750 to 1300 nm. When a wavelength of 400 nm or below is used, denaturation or damage of nucleic acid can occur. In addition, the laser may be generated from more than one wavelength band. In other words, the laser may be one of the wavelengths in a wavelength range or may be two different wavelengths.

In order for the micro-particles M1 to collect target materials (e.g., cells, viruses, etc.) from biomaterial sample such as whole blood, saliva, or urine, the micro-particles M1 have surfaces that make specific binding with the target materials possible. The surfaces of the micro-particles M1 may be treated with antibodies or metal oxides, both having an affinity for target cells and viruses.

The antibodies may selectively collect desired specific cells or viruses, and, thus, are useful when detecting significantly low concentrated cells or viruses. The micro-particles combined with antibodies which can be specifically bonded to cells or viruses are sold by Invitrogen Corporation and Qiagen N. V. Examples of the micro-particles may be magnetic beads such as Dynabeads® Genomic DNA Blood (Invitrogen), Dynabeads® anti-*E. coli* 0157 (Invitrogen), CEL-Lection™ Biotin Binder Kit (Invitrogen), and MagAttract Virus Min M48 Kit (Qiagen). Diphtheria toxin, *Enterococcus faecium*, Helicobacter pylori, HBV, HCV, HIV, Influenza A, Influenza B, *Listeria, Mycoplasma pneumoniae, Pseudomonas* sp., Rubella virus, and Rotavirus can be separated using micro-particles combined with specific antibodies.

The metal oxides may be at least one of $Al_2O_3$, $TiO_2$, $Ta_2O_3$, $Fe_2O_3$, $Fe_3O_4$, or $HfO_2$, but are not limited thereto. The metal oxides may be $Al_2O_3$ or $TiO_2$, for example, $Al_2O_3$. Deposition of the metal oxides can be performed by physical vapor deposition (PVD), atomic layer deposition (ALD), or using a sol-gel method. A method of depositing metal oxides on a surface of micro-particles is well known in the field and is generally performed by PVD, ALD, or a sol-gel method.

The size of the micro-particles M1 may be 50 nm to 1,000 μm, for example, 1 μm-50 μm. In addition, the micro-particles M1 may be mixed with particles having two or more different sizes. In other words, the micro-particles M1 may have the same sizes or may be mixed micro-particles having different sizes.

The micro-particles M1 may be formed of any magnetized materials. In particular, the micro-particles M1 may include at least one material of Fe, Ni, and Cr and oxides thereof which are ferromagnetic metals.

Figure 2:
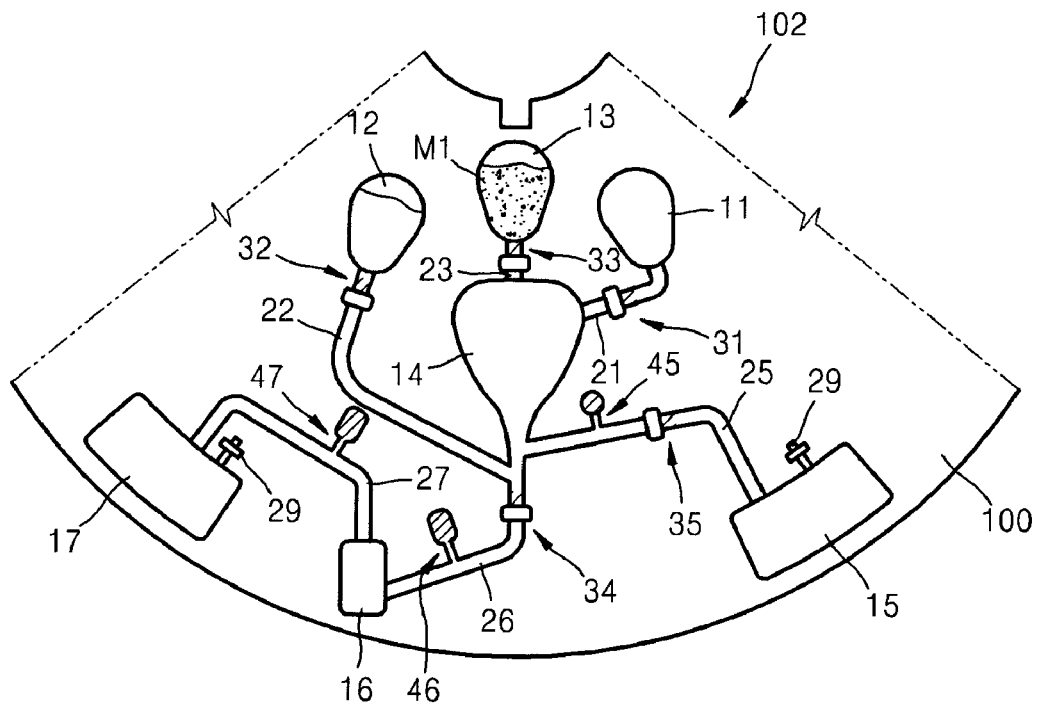
FIG. 2 is a plan view schematically illustrating a microfluidic device for nucleic acid extraction according to another exemplary embodiment of the present invention.

FIG. 2 is a plan view schematically illustrating a microfluidic device 102 for nucleic acid extraction according to another exemplary embodiment of the present invention. The microfluidic device 102 according to the current exemplary embodiment of the present invention is almost the same as the microfluidic device 101 of FIG. 1 according to the previous exemplary embodiment of the present invention. However, the microfluidic device 102 further includes a micro-particle chamber 13 which is closer to the center of the body of revolution 100 than the mixing chamber 14, wherein the micro-particle chamber 13 contains micro-particles M1. In addition, a valve 33 disposed on a channel 23 connects the micro-particle chamber 13 with the mixing chamber 14, and the micro-particles M1 contained in the micro-particle chamber 13 are provided to the mixing chamber 14 when the valve 33 is opened. Here, the micro-particles M1 may be injected into the micro-particle chamber 13 in a dispersed form in a predetermined fluid.

Figure 3:
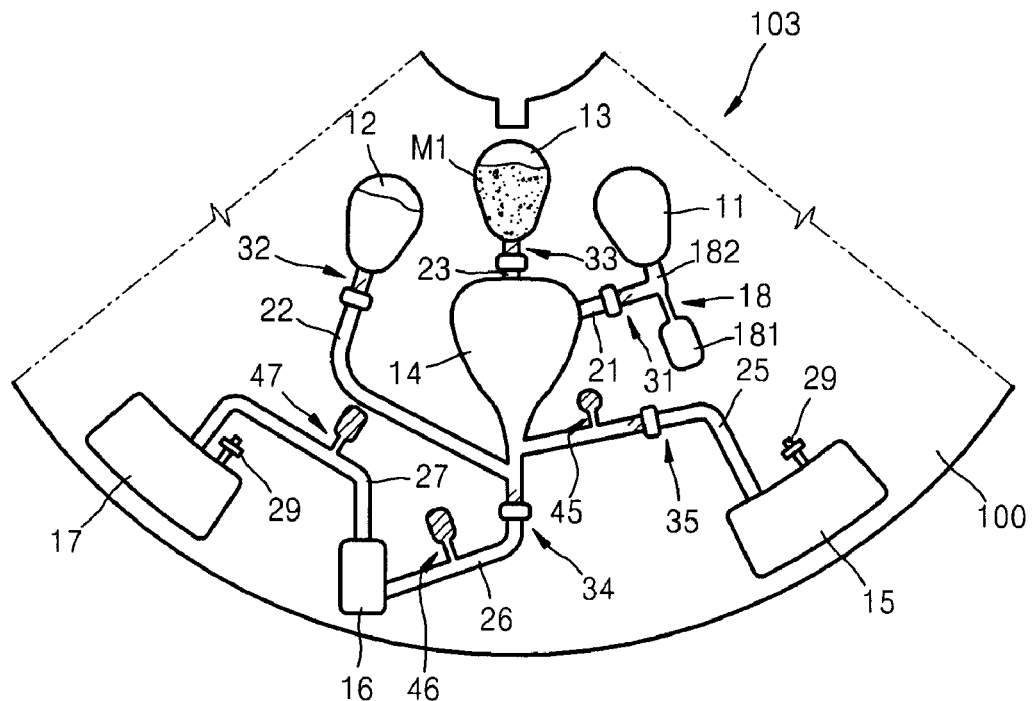
FIG. 3 is a plan view schematically illustrating a microfluidic device for nucleic acid extraction according to another exemplary embodiment of the present invention.

FIG. 3 is a plan view schematically illustrating a microfluidic device 103 for nucleic acid extraction according to another exemplary embodiment of the present invention.

The microfluidic device 103 according to the current exemplary embodiment of the present invention is almost the same as the microfluidic device 102 of FIG. 2 according to the previous exemplary embodiment of the present invention.

However, the microfluidic device 103 further includes a centrifuging unit 18 which is interposed between the outlet of the sample chamber 11 and the mixing chamber 14. The centrifuging unit 18 includes a supernatant channel 182 and a precipitate collecting unit 181, and is connected with the mixing chamber 14 through the valve 31 and the channel 21, wherein the supernatant channel 182 is extended from the outlet of the sample chamber 11 towards the outside of the body of revolution 100, and the precipitate collecting unit 181 having expanded width is disposed at the end part of the supernatant channel 182.

For example, when whole blood is injected into the sample chamber 11 and then the body of revolution 100 is rotated, heavy blood cells are collected in the precipitate collecting unit 181 and serum is filled in the supernatant channel 182. In this case, when the valve 31 of the channel 21 is opened, serum, which is filled in the part closer to the center of the body of revolution 100 than the connecting point of the channel 21 in the supernatant channel 182, is transferred to the mixing chamber 14. In the microfluidic device 103 according to the current exemplary embodiment of the present invention, a possibility that PCR inhibiting factors could mix into final nucleic acid extracted solution can be reduced beforehand by the centrifuging unit 18.

Figure 4:
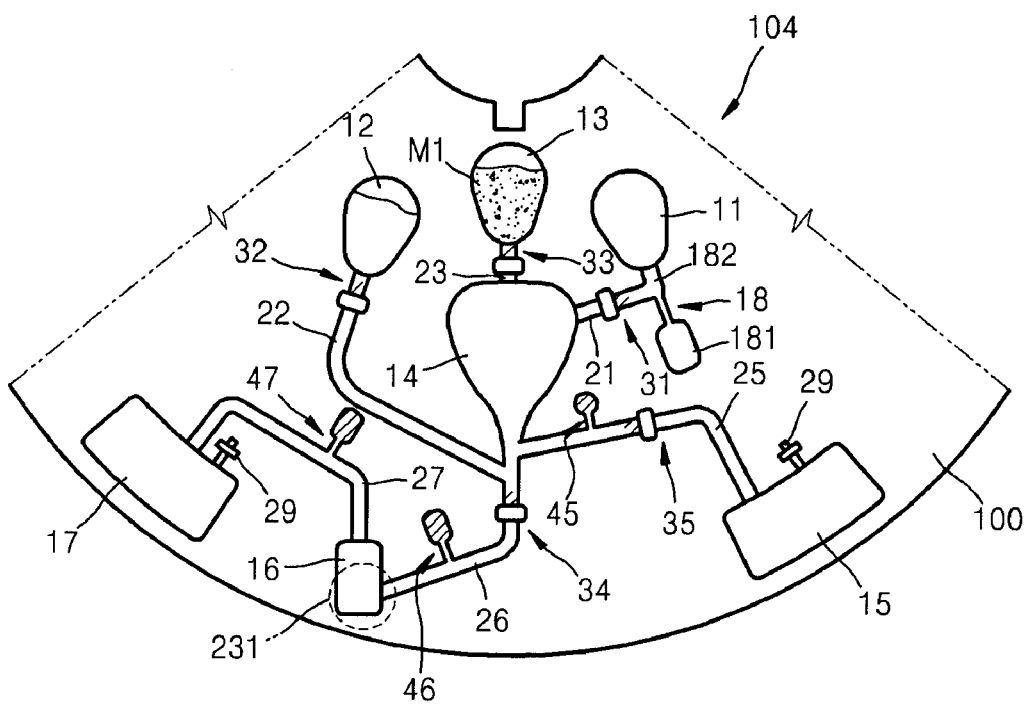
FIG. 4 is a plan view schematically illustrating a microfluidic device for nucleic acid extraction according to another exemplary embodiment of the present invention.

FIG. 4 is a plan view schematically illustrating a microfluidic device 104 for nucleic acid extraction according to another exemplary embodiment of the present invention. The microfluidic device 104 according to the current exemplary embodiment of the present invention is almost the same as the microfluidic device 103 of FIG. 3 according to the previous exemplary embodiment of the present invention. However, the microfluidic device 104 further includes a magnet 231 disposed near the cytolysis chamber 16 for the micro-particles M1 to be collected in the cytolysis chamber 16 by magnetic force when the micro-particles M1 are magnetic beads.

The magnet 231 can be disposed on the lower surface, upper surface, or both surfaces of the body of revolution 100 of the microfluidic device 104. In addition, the magnet 231 can be immobilized on the body of revolution 100 or can be placed near the cytolysis chamber 16, if needed. Under such conditions, the magnet 231 can radially move along the body of revolution 100 or can quickly vibrate. Since the magnet 231 vibrates during cytolysis by laser ablation, the micro-particles M1 contained in the cytolysis chamber 16 can also be vibrated and thus efficiency of cytolysis can be improved.

The valves 31, 32, 33, 34, 35, 45, 46, and 47 described in the above exemplary embodiments can include at least one of a capillary valve, a hydrophobic valve, a mechanical valve, and a phase-change valve. The phase-change valve includes a valve plug having heat generating particles and phase-change materials, the heat generating particles absorbing radiation energy from the outside and the phase-change materials melting by heat generated from the heat generating particles. The phase-change valve controls flow of fluid passing through the channels according to positions of the valve plug in the channels.

Here, the phase-change valve may include an opening valve, wherein the opening valve is disposed for the valve plug to close the channel at an initial stage and moves to a space which is adjacent to the initial position of the valve plug after the valve plug is melted by heat, to open the channel. In addition, the phase-change valve may also include a closing valve which is disposed in a valve chamber connecting with the channel for the valve plug to open the channel at an initial stage and to flow into the channel after the valve plug is melted and expanded by heat, to close the channel.

Figure 5:
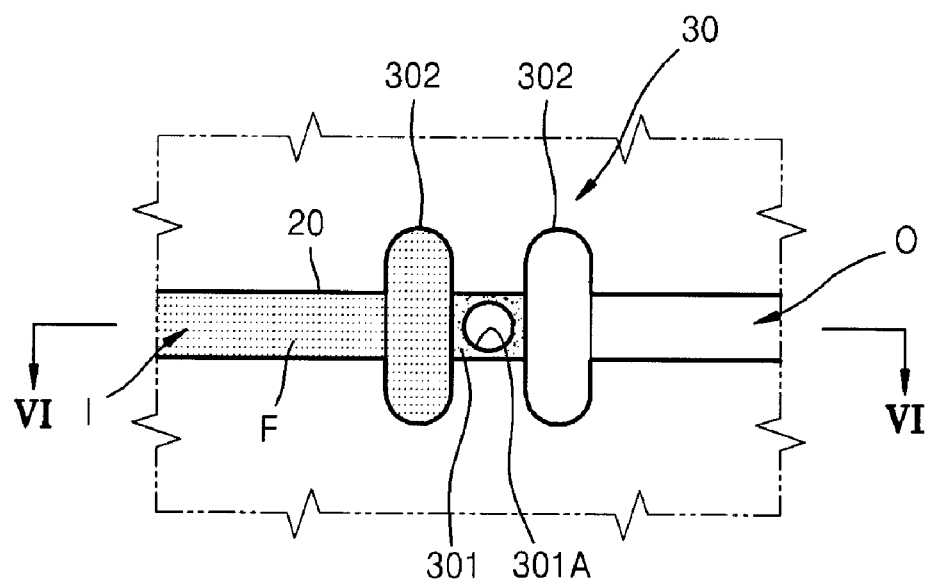
FIG. 5 is a plan view of an opening valve which controls fluid flow in a microfluidic device according to an exemplary embodiment of the present invention.
Figure 6:
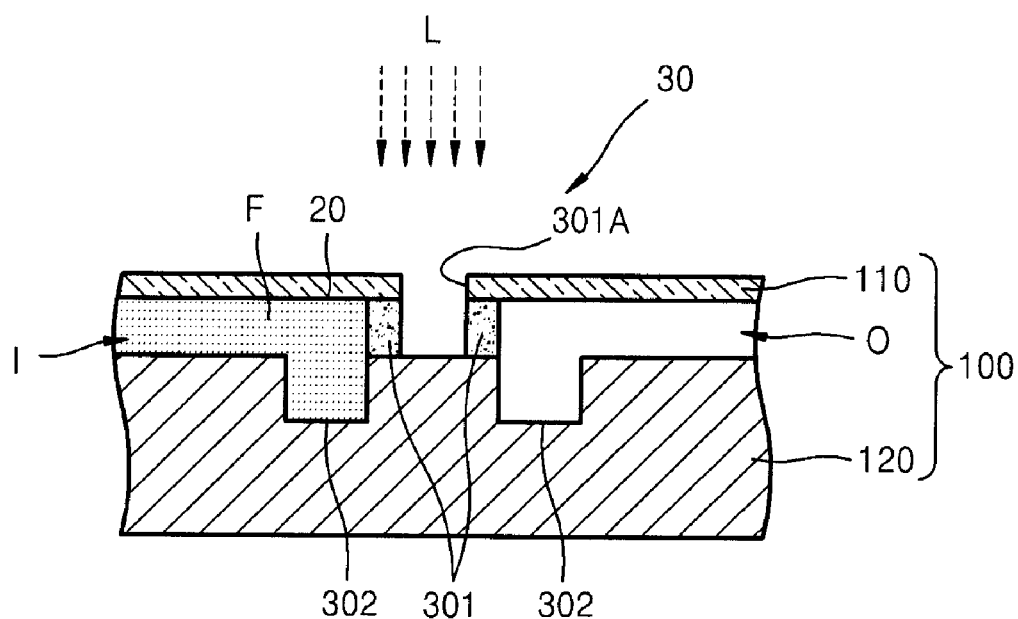
FIG. 6 is a cross-sectional views of the opening valve of FIG. 5 illustrating an initial stage according to another exemplary embodiment of the present invention.

FIG. 5 is a plan view of an opening valve which controls fluid flow in a microfluidic device according to an exemplary embodiment of the present invention. FIG. 6 is a cross-sectional view of the opening valve of FIG. 5 illustrating an initial stage.

The microfluidic devices 101 through 104 described above include a valve unit, wherein the valve unit controls fluid flow. An opening valve 30 representing the valves 31-35, 40, and 45-47 which is an example of a valve unit includes a valve plug 301 formed of a valve material being in a solid-state at room temperature. The valve material may include a dispersing medium formed of a phase-change material being in a solid-state at room temperature and heat generating particles dispersed in the dispersing medium. In a lower part and an upper part of a channel 20 representing the channels 21-23 and 25-27 which is adjacent to the initial position of the valve plug 301, wherein the valve plug 301 is in a solid state, a pair of channel expansion portions 302 providing an available space prepared by expanding the width or the depth of the channel expansion portions 302 is disposed.

The valve plug 301 prevents fluid samples F flowing from an inlet I by completely blocking the channel 20 centering around an opening portion 301A at room temperature. When the valve plug 301 is melted at high temperature, it flows along a lower part and an upper part of the channel 20 and moves to the adjacent channel expansion portions 302 and thus is solidified again while the channel 20 is opened. The opening portion 301A also has a function as an inlet through which the melted valve material is injected to form the valve plug 301 in fabricating the microfluidic device.

Figure 17:
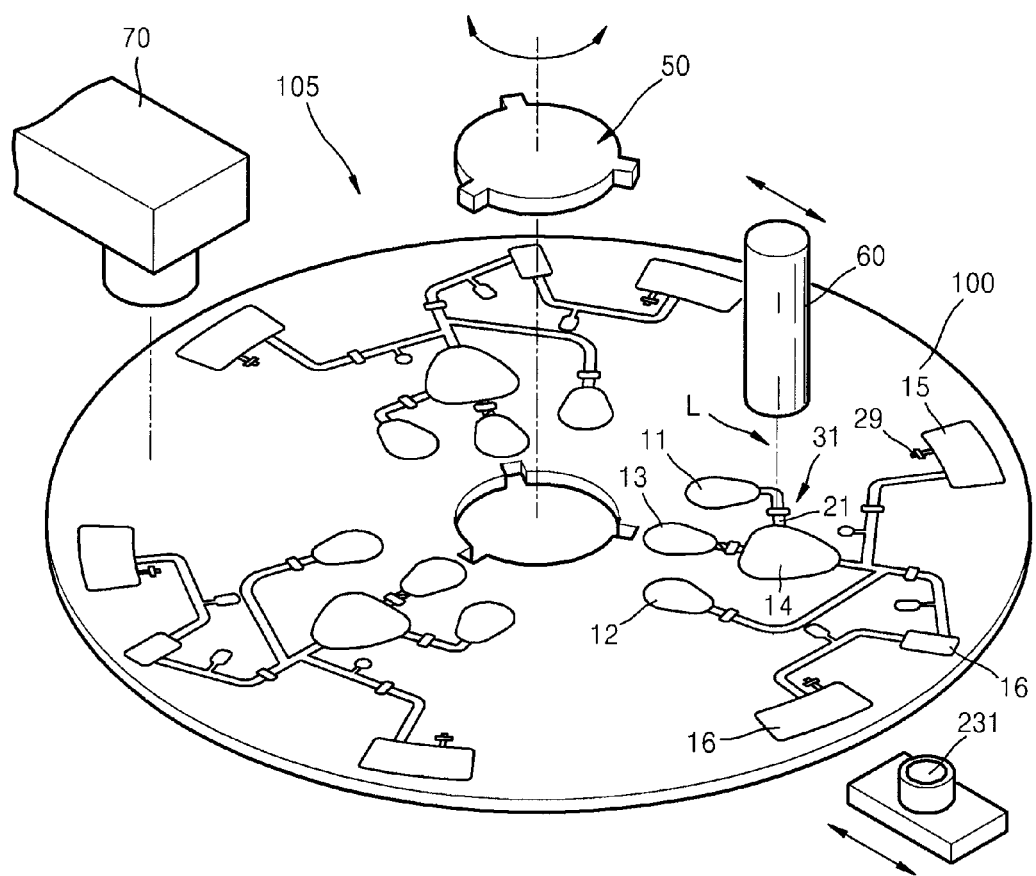
FIG. 17 is a perspective view schematically illustrating a microfluidic system according to an exemplary embodiment of the present invention.

In order to heat the valve plug 301, an external energy source 60 (as shown in FIG. 17) is disposed outside the microfluidic devices 101 through 104, and the external energy source 60 radiates electromagnetic waves onto the initial position of the valve plug 301, that is, the opening portion 301A and a region around the opening portion 301A. In this case, the external energy source 60 may be, for example, a laser light source irradiating laser beams. Here, at least one laser diode can be included. When the laser light source irradiates a pulse laser, a pulse laser having energy of 1 mJ/pulse or above can be irradiated. When the laser light source irradiates a continuous wave laser, a continuous wave laser having an output of 10 mW or above can be irradiated.

In an experiment described in FIGS. 9 through 12, a laser light source irradiating laser light having a wavelength of 808 nm is used, but is not limited thereto. Any laser light source which can irradiate laser light having a wavelength of 400 to 1300 nm can be used as the external energy source 60 in the microfluidic system.

The channel 20 can be provided by a three-dimensional pattern formed on an inner part of an upper disk 110 or an inner part of a lower disk 120, both constituting a body of revolution. The upper disk 110 transmits electromagnetic waves irradiated from the external energy source (not illustrated) to be incident onto the valve plug 301. In addition, the upper disk 110 may be formed of optically transparent material in order to observe the fluid samples F from the outside. For example, glass or transparent plastic have excellent optical transparency and low manufacturing costs.

The channel 20 and a pair of the channel expansion portions 302 may be disposed on the body of revolution 100 formed of the upper disk 110 and the lower disk 120, wherein the upper disk 110 and the lower disk 120 are bonded to each other. The method of bonding the upper disk 110 and the lower disk 120 includes using an adhesive agent or double-sided adhesive tape, or ultrasonic welding. More specifically, the channel 20 and a pair of the channel expansion portions 302 are formed by a negative pattern on the lower disk 120. In addition, the opening portion 301A is formed on the upper disk 110 to inject valve material between the channel expansion portions 302. The channel 20 is a micro channel having the width of 1 mm and the depth of 0.1 mm. The channel expansion portions 302 can be formed to have a depth of approximately 3 mm.

The size of the heat generating particles dispersed in the valve plug 301 may be of the order of thousands of μm, and may have a diameter of 1 nm to 100 μm so as to freely move in the channel 20. When laser is irradiated, the temperature of the heat generating particles rapidly increases by the radiation energy so as to generate heat, and the heat generating particles are uniformly dispersed to wax. In order for the heat generating particles to be dispersed uniformly, the heat generating particles may have structures including a core having a metallic component and a hydrophobic shell. For example, the heat generating particles may include a core formed of Fe which is a ferromagnetic material, and a shell formed of a plurality of surfactants which are bonded to Fe to surround the core. In general, the heat generating particles are provided in a dispersed form on carrier oil. In order for the heat generating particles having hydrophobic surfaces to be dispersed uniformly, the carrier oil may also be hydrophobic. The valve plug 301 can be manufactured by mixing the carrier oil in which the heat generating particles are dispersed thereto with the wax. The form of the heat generating particles is not limited to the examples above and may be polymer beads, quantum dots, Au nanoparticles, Ag nanoparticles, beads with metal composition, carbon particles, or magnetic beads. Examples of the carbon particles include graphite.

The valve plug 301 may include a phase-change material such as wax. When the radiation energy absorbed by the heat generation particles is dissipated in the form of heat energy, the wax is melted so as to have fluidity and thus a form of the valve plug 301 is broken down to open the flow channel of the fluid samples F. The wax forming the valve plug 301 may have an adequate melting point. When the melting point of the wax is too high, time required for the wax to be melted after laser irradiation is started increases, and, thus, an opening time is hardly controlled. When the melting point of the wax is too low, the fluid samples F can leak, since the wax is partially melted while laser is not irradiated. Examples of the wax may be paraffin wax, microcrystalline wax, synthetic wax, or natural wax.

Meanwhile, the phase-change material may be gel or a thermoplastic resin. Example of the gel may include polyacrylamide, polyacrylates, polymethacrylates, and polyvinylamides. In addition, the thermoplastic resin may be COC, PMMA, PC, PS, POM, PFA, PVC, PP, PET, PEEK, PA, PSU, or PVDF.

Figure 7:
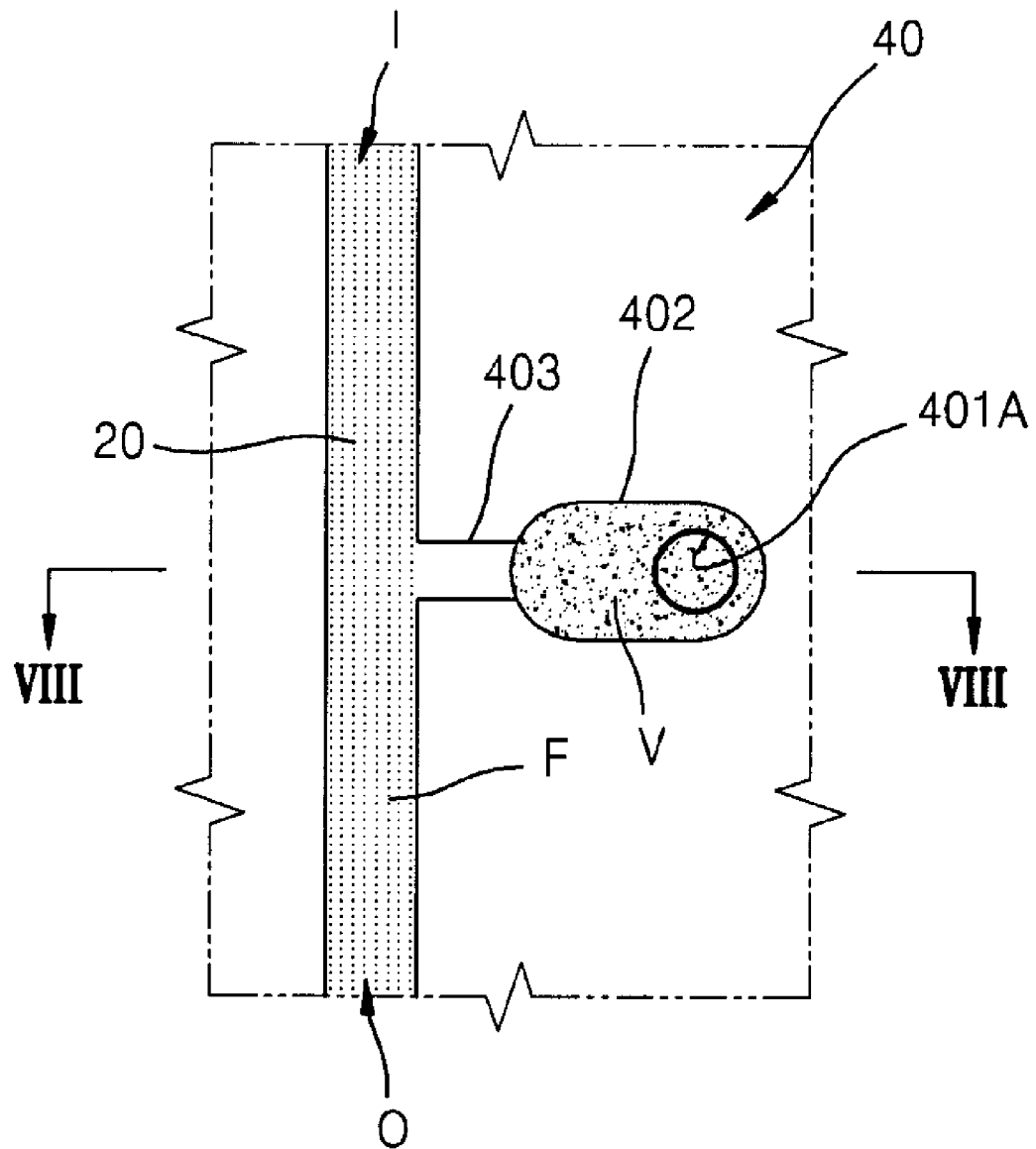
FIG. 7 is a plan view of a closing valve which controls fluid flow in a microfluidic device according to an exemplary embodiment of the present invention.
Figure 8:
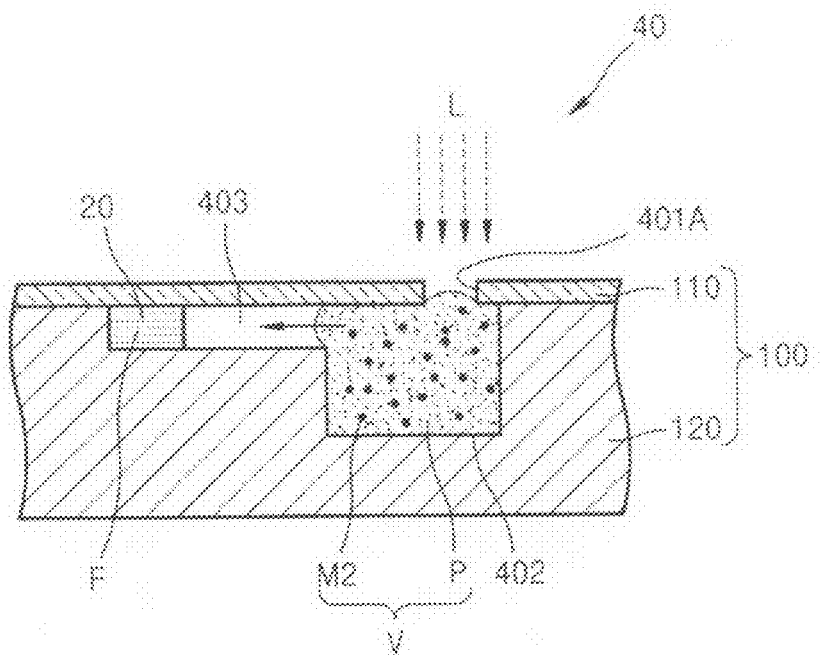
FIG. 8 is a cross-sectional view of the closing valve of FIG. 7, according to an exemplary embodiment of the present invention.

FIG. 7 is a plan view of a closing valve which controls fluid flow in a microfluidic device according to an exemplary embodiment of the present invention, and FIG. 8 is a cross-sectional view of the closing valve of FIG. 7, according to an exemplary embodiment of the present invention.

The closing valve 40 which is another example of the valve unit, includes a channel 20, a valve chamber 402, and a valve material V. Here, the channel 20 includes an inlet I and an outlet O, the valve chamber 402 is connected to the center of the channel 20, and the valve material V filled in the valve chamber 402 in a solid-form under room temperature at an initial stage flows into the channel 224 after the valve material V is melted and expanded by heating, and is solidified again to block fluid flowing through the channel 20. Here, the closing valve 40 is one of the elementary units which constitutes the microfluidic structure in the microfluidic devices 101 through 104 described above. Each of the inlet I and the outlet O is connected to a different unit, respectively. The channel 20 acts as a path which enables the fluid sample F to move between the units.

Similar to the above-described opening valve 30, the structure of the closing valve 40 can be provided by a three-dimensional pattern formed on an inner part of an upper disk 110 or an inner part of a lower disk 120, both consisting of the body of revolution 100 of the microfluidic devices 101 through 104. However, the depth of the valve chamber 402 may be larger than that of the channel 20, and smaller than that of the channel expansion portions 302 of the opening valve 30, for example, 1 mm. The upper disk 110 may be formed of optically transparent material in order to transmit electromagnetic waves irradiated from the external energy source (not illustrated) and to observe the fluid samples F from the outside. In addition, the upper disk 110 may have an opening portion 401A which corresponds to the valve chamber 402 in order for electromagnetic waves (for example, a laser beam) to be easily incident onto the valve plug. The opening portion 401A also has a function as an inlet through which the valve material is injected in fabricating the microfluidic devices 101 through 104.

Phase-change materials P and heat generation particles M2 forming the valve material V are the same as those of the opening valve 30 described above. In addition, the external energy source 60 which provides electromagnetic waves to the valve material V is as described above. When a laser beam is irradiated to the valve material V including the phase-change materials P and the heat generating particles M2, the heat generating particles M2 absorb radiation energy to heat the phase-change materials P. Accordingly, the volume of the valve material V is expanded while it is melted, and the valve material V flows into the channel 20 through a path 403 connected with the channel 224. The valve material V which is formed by solidification after contacting with the fluid samples F in the channel 224 forms the valve plug and blocks the fluid samples F flowing through the channel 224.

An experiment on measuring the response time of the valve unit described above was carried on and the result thereof is as follows. In a test chip used in the experiment, the pressure of an operating fluid maintains at 46 kPa. In order to maintain the pressure, a syringe pump (Havard PHD2000, USA) and a pressure sensor (MP 5500DP, Freescale semiconductor Inc., AZ, USA) were used. A laser light source with a radiated wavelength of 808 nm and an output of 1.5 W was used as an external energy source which radiates electromagnetic waves onto the valve unit. Data related to the response time of the valve unit was obtained by analyzing the result of a high speed camera (Fastcam-1024, Photron, Calif., USA). For the valve materials, magnetic wax was used, wherein the magnetic wax is mixed with ferrofluid, in which magnetic bead having an average diameter of 10 nm is dispersed in carrier oil, and paraffin wax in the ratio of 1 to 1, that is, the volume ratio of the ferrofluid is 50%.

Figure 9:
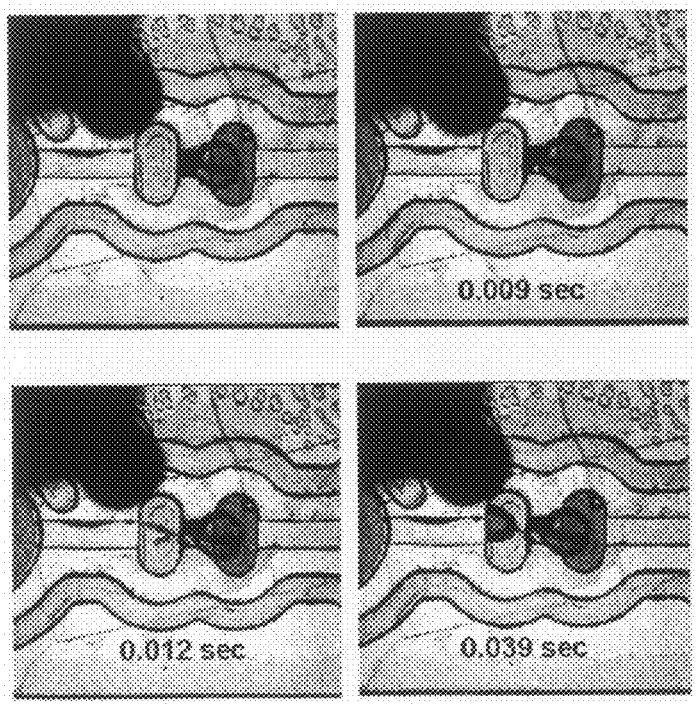
FIG. 9 is a series of photo images captured by a high speed camera illustrating operations of the opening valve according to an exemplary embodiment of the present invention.

FIG. 9 is a series of photo images captured by a high speed camera illustrating operations of the opening valve according to an exemplary embodiment of the present invention.

Referring to FIG. 9, the response time from the time when laser beam starts radiating onto the valve plug of the opening valve to the time when valve plug is melted and thus the channel is opened was 0.012 seconds.

Figure 10:
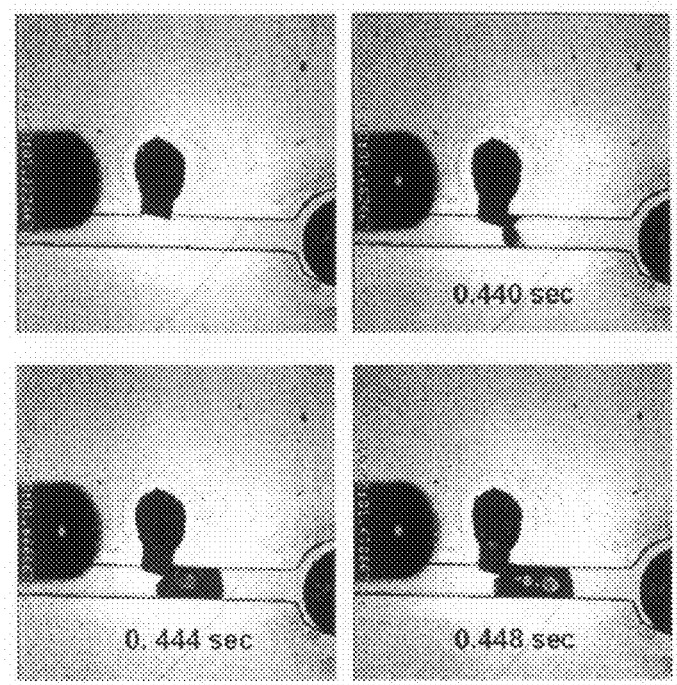
FIG. 10 is a series of photo images captured by a high speed camera illustrating operations of the closing valve according to an exemplary embodiment of the present invention.

FIG. 10 is a series of photo images captured by a high speed camera illustrating operations of the closing valve according to an exemplary embodiment of the present invention.

Referring to FIG. 10, the response time from the time when laser beam starts radiating onto the valve material of the closing valve to the time when valve material is melted and thus the channel 224 is closed was 0.444 seconds. The response is much faster than that of a conventional wax valve which took 2 through 10 seconds.

Figure 11:
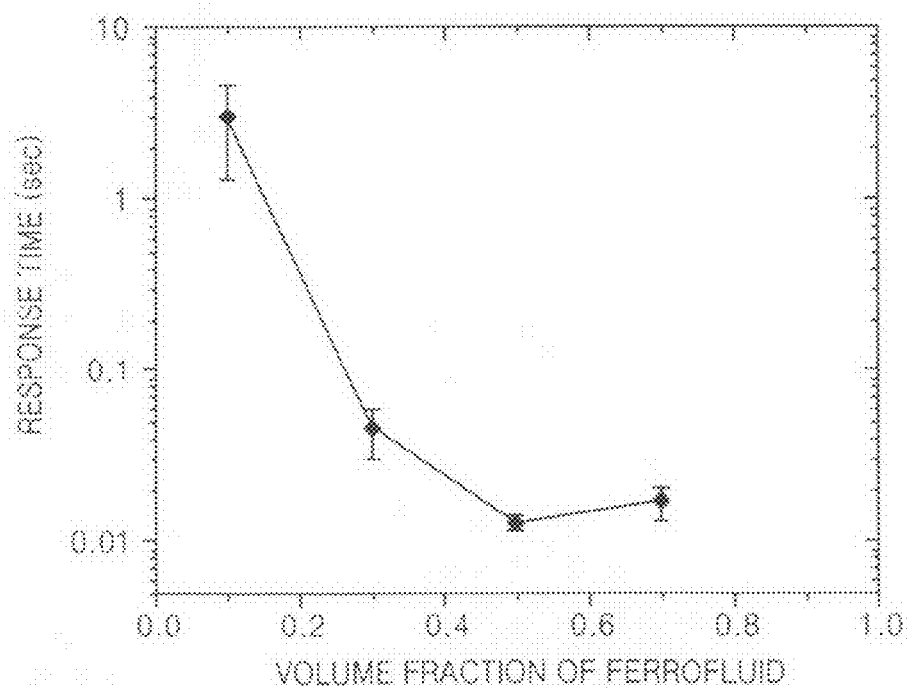
FIG. 11 is a graph illustrating the relationship between a volume ratio of ferrofluid included in a valve plug of the opening valve and the response time of the valve, according to an exemplary embodiment of the present invention.

FIG. 11 is a graph illustrating the relationship between a volume ratio of ferrofluid included in a valve plug of the opening valve and the response time of the valve, according to an exemplary embodiment of the present invention.

Referring to FIG. 11, as the volume ratio of the ferrofluid increases, the response time reduces. However, apart from this, when the volume ratio of the ferrofluid increases to 70% or above, the maximum hold-up pressure of the valve plug may be lowered. Therefore, in the valve unit, the volume ratio of the ferrofluid that will be included in the valve material can be determined by a compromise between a demand for the response time and a demand for the maximum hold-up pressure.

Figure 12:
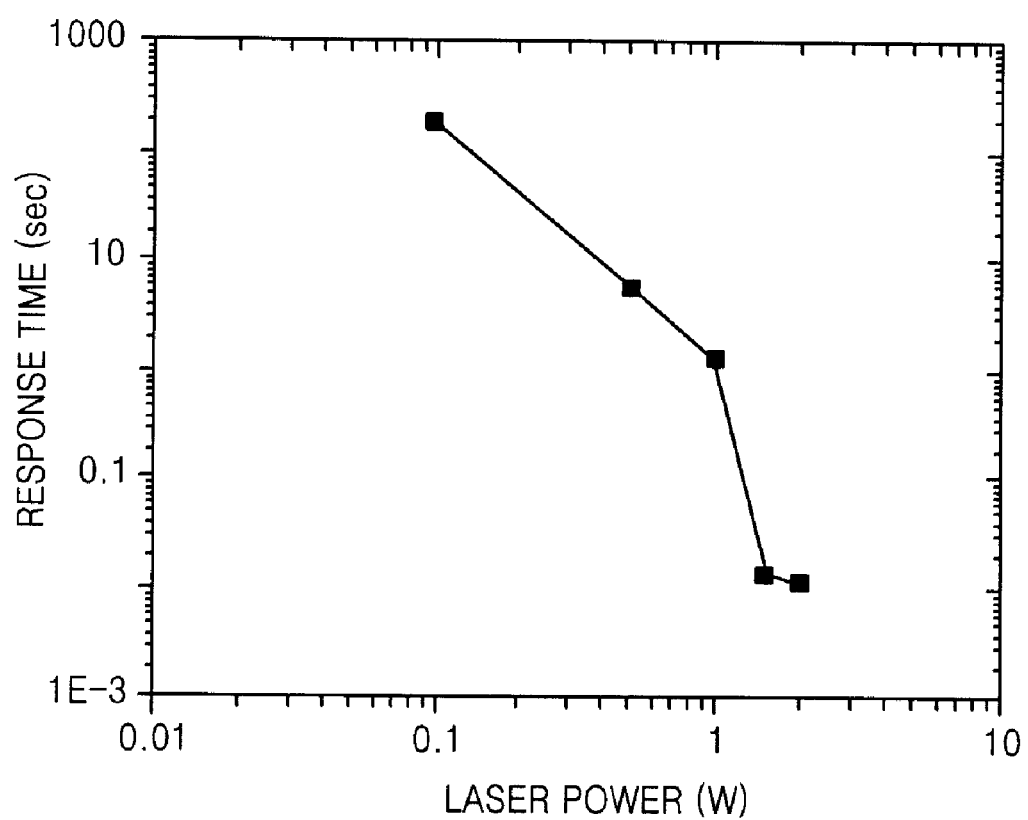
FIG. 12 is a graph illustrating the relationship between laser output power used as an external energy source in the opening valve and the response time of the valve, according to an exemplary embodiment of the present invention.

FIG. 12 is a graph illustrating the relationship between laser output power used as an external energy source in the opening valve and the response time of the valve, according to an exemplary embodiment of the present invention.

Referring to FIG. 12, as the output power increases, the response time reduces. However, when laser output power approaches 1.5 W, the change of the response time becomes gentle (while not illustrated in the graph). When laser output power exceeds 1.5 W, the response time is converged to a predetermined minimum. This is because of the restriction of thermal conductivity through paraffin wax. Accordingly, in this experiment, a laser light source with an output of 1.5 W was used, but the external energy source of the present invention is not limited thereto.

Figure 13:
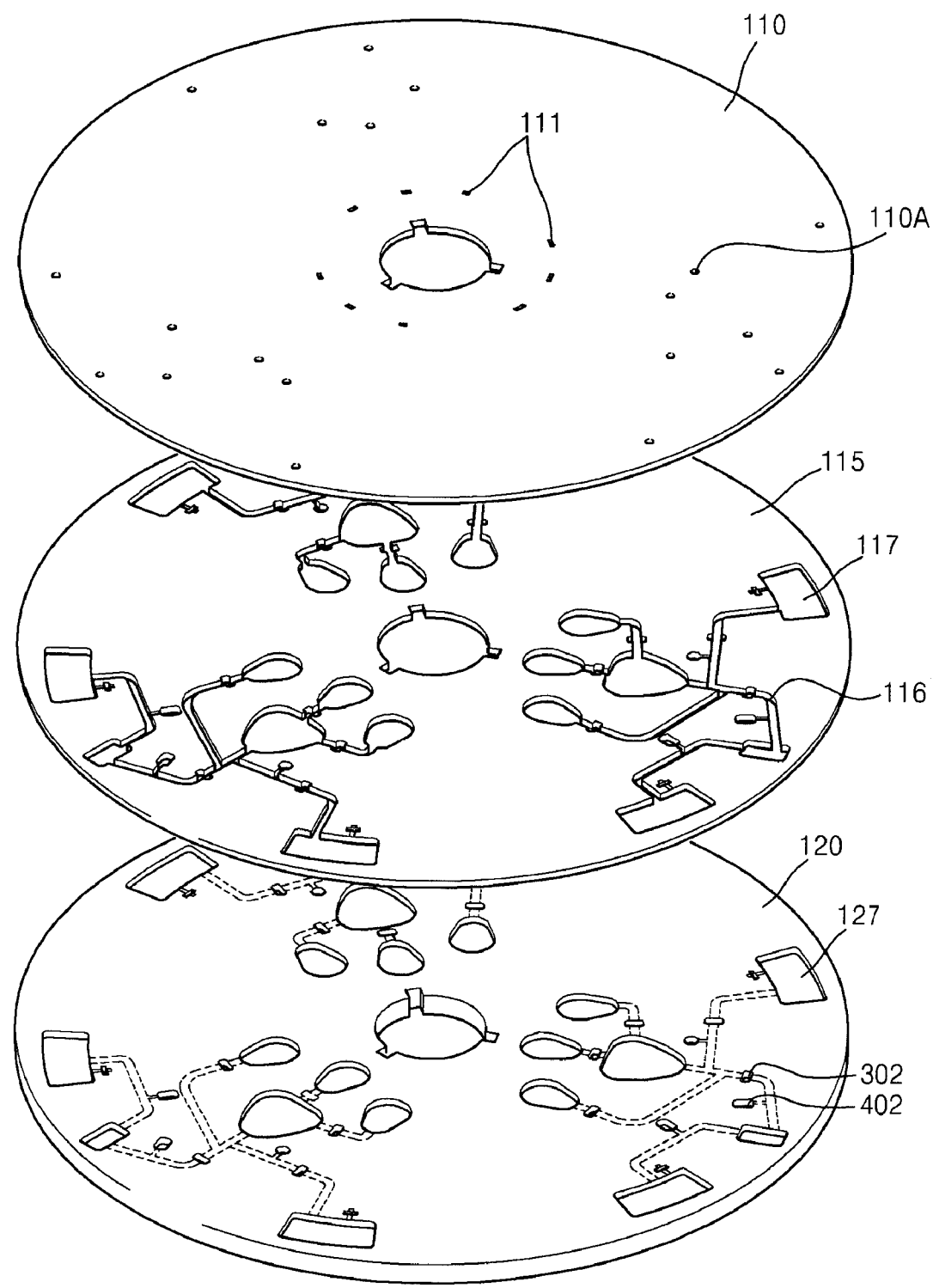
FIG. 13 is an exploded perspective view of the microfluidic device for nucleic acid extraction of FIG. 4, according to an exemplary embodiment of the present invention.

FIG. 13 is an exploded perspective view of the microfluidic device for nucleic acid extraction of FIG. 4, according to an exemplary embodiment of the present invention. Referring to FIG. 13, the microfluidic device 104 according to the current exemplary embodiment of the present invention includes the upper disk 110, the lower disk 120, and a double-sided adhering sheet 115 for adhering the upper disk 110 and the lower disk 120 to each other. The upper disk 110 and the lower disk 120 may be formed of a transparent plastic substrate, for example, a polycarbonate substrate.

The upper disk 110 includes a plurality of inlets 111 penetrating the upper and lower surface of the upper disk 110, and a plurality of punching units 110A. The inlets 111 are disposed to correspond to the sample chamber, the micro-particle chamber, and the buffer chamber described above. The punching units 110A may be disposed to correspond to the initial stage of the valve plug in the phase-change valves described above.

The lower disk 120 includes a plurality of grooves 127 having a predetermined depth to form a chamber structure together with the upper disk 110. The predetermined depth may be, for example, 3 mm. In addition, the upper disk 120 may further include negative structures which form the channel expansion units 302 and the valve chamber 402 with the upper disk 110.

The double-sided adhering sheet 115 may be formed of conventionally used double-sided adhering tape, for example, Flexmount DFM 200 Clear V-95150 POLY H-9 V-96 4, FLEXcon Inc., MA, USA. The double-sided adhering sheet 115 includes a plurality of chamber outlines 117 which correspond to the grooves 127, and a plurality of channel outlines 116 which respectively correspond to the channels described in the description of FIG. 4. The channel outlines 116 may have the width of 1 mm. Since the conventionally used double-sided adhering tape has a thickness of 100 μm, the depth of the channel which is formed by the upper disk 110, lower disk 120, and the double-sided adhering sheet 115 is 100 μm. The depth of the channel may be easily changed according to a thickness of the double-sided adhering sheet 115.

The inlets 111, the punching units 110A, the grooves 127, and the channel outlines 116 may be respectively formed in the upper disk 110, the lower disk 120, and the double-sided adhering sheet 115 by using a computer numerical control (CNC) machining.

A detailed structure and standard of the microfluidic device described above is only an example and is not limited to the example. For example, the upper disk 110 and the lower disk 120 may be bonded to each other by using various plastic bonding methods such as thermal bonding, low temperature bonding, chemical bonding, or ultrasonic bonding, instead of using the double-sided adhering sheet 115. The specification of the channels and chambers may vary according to a size of the whole microfluidic device 104 and a capacity of the sample that is to be processed. In addition, in the exemplary embodiments of the present invention, the microfluidic structure is prepared in one layer. However, the microfluidic device can be formed by a plurality of layers and each layer may include the microfluidic structure including channel and chamber.

Figure 14A:
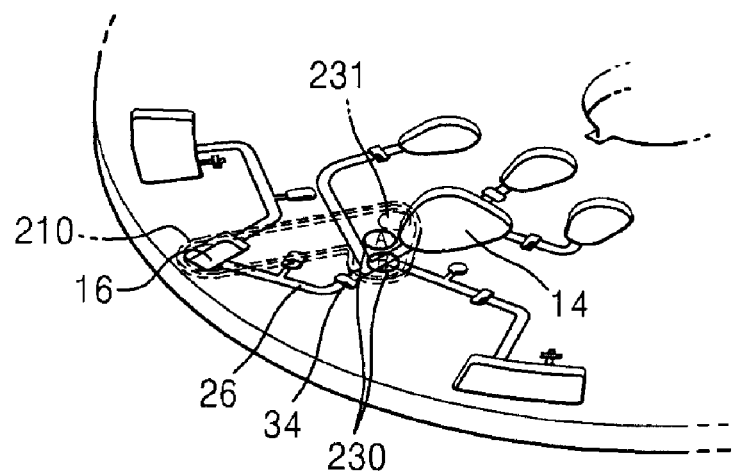
FIGS. 14A and 14B illustrate a microfluidic device for nucleic acid extraction in which a magnetic position control device is added, according to another exemplary embodiment of the present invention.
Figure 14B:
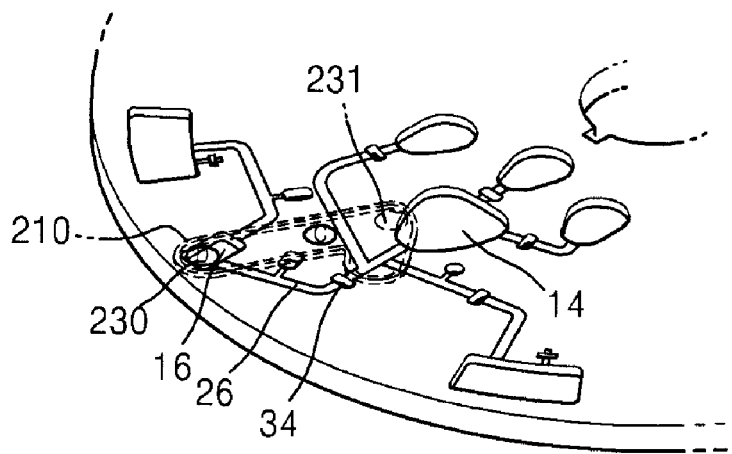

FIGS. 14A and 14B illustrate a microfluidic device for nucleic acid extraction in which a magnetic position control device is added, according to another exemplary embodiment of the present invention. Referring to FIGS. 14A and 14B, a position of a first magnet 230 is controlled under the microfluidic device as illustrated in FIG. 4 so that the magnetic position control device is included in the microfluidic device to move and trap the micro-particles in the microfluidic device when the micro-particles are magnetic beads. Some of the elements of the magnetic position control device may be included in a bottom layer of the lower disk in the microfluidic device as illustrated in FIG. 13.

The magnetic position control device includes the first magnet 230, a guide rail to guide a moving path of the first magnet 230, and a second magnet 231 disposed outside of the microfluidic device to correspond to the nearest position from the center of the rotation within the moving path. When the microfluidic device is rotated, a centrifugal force in a direction toward the outside of the radius and a magnetic force (gravity) by the second magnet 231 are influenced in the first magnet 230 in the guide rail 210, and the first magnet 230 moves to a position where both forces are balanced. The first and second magnets 230 and 231 are permanent magnets and are disposed to influence gravity to each other. Example of the permanent magnet may be a neodymium magnet (NMd—Fe—B, JungWoo, Korea).

FIG. 14A illustrates the microfluidic device which rotates in a clockwise direction. When the microfluidic device is rotated at the speed of approximately 480 rpm, the first magnet 230 moves to B. When the microfluidic device is rotated at the speed of approximately 180 rpm, the first magnet 230 moves to A. Since the first magnet 230 moves from B to A, the magnetic beads that are concentrated in the narrow outlet valve 34 in the mixing chamber 14 can be pulled up to a wide portion of the mixing chamber 14.

FIG. 14B illustrates the microfluidic device which rotates in a counterclockwise direction. When the microfluidic device is rotated at the speed of approximately 480 rpm, the first magnet 230 moves to C. When the microfluidic device is rotated at the speed of approximately 600 rpm or faster, a centrifugal force overcomes a magnetic force and the first magnet 230 moves to D. By using such movement of the first magnet 230, the magnetic beads which are entered through the channel 26 from the inner part of the mixing chamber 14 by a centrifugal force can be concentrated in the cytolysis chamber 16.

As described above, the shape of the guide rail can be changed according to arrangements of the chambers and channels in the microfluidic device, and the order of movement of the fluid including the magnetic beads. Therefore, the guide rail can be any path which can connect various positions having each different distance from the axis of rotation and move the first magnet 230.

FIGS. 15A through 15K are photographic images illustrating a process of extracting DNA of Hepatitis B virus (HBV) extracted from a blood sample using the microfluidic device 104 of FIG. 4, according to an exemplary embodiment of the present invention. According to a description below, features of the microfluidic device will be shown more clearly.

Magnetic beads as an example of the micro-particles were prepared before an experiment was conducted.

1) Preparing an antibody for micro-particles and modifying surfaces of the micro-particles: 10 μl of a second antibody solution (Virostat, 1817, host animal: rabbit) having a unique affinity for a surface antigen of HBV to which biotin adhered was prepared.

2) Washing micro-particles: 100 μl of Dynabeads® Streptavidin C1 having a diameter of 1.0 μm which was labeled with streptavidin was mixed with 10 μl of the second antibody solution to manufacture a homogeneous solution. 100 μl of the manufactured solution was put into a tube, placed on a magnet, and maintained there for 2 minutes. Supernatant was obtained using a pipet to be removed from the resultant solution. The tube was removed from the magnet and 100 μl of a buffer solution 1 (PBS with pH7.4 including 0.1% of BSA) was added to the solution from which supernatant was removed. Then, the mixed solution was placed on the magnet (and maintained there) for 2 minutes. Supernatant was obtained using a pipet to be removed from the resultant solution. The tube was removed from the magnet and 100 μl of a buffer solution 1 (PBS with pH7.4 including 0.1% of BSA) was added to the solution from which supernatant was removed.

3) Pre-coating of beads using an antibody: 8 μg of a HBV second antibody solution (Virostat, 1817) to which biotin adhered was mixed with 100 μl of a bead solution prepared as above. The solution was turned upside down several times and incubated for 30 minutes at ambient temperature. Magnetic beads were collected for 2 minutes using a magnet and supernatant was removed. 2 ml of a washing buffer solution (PBS pH7.4 including 1% of BSA) was added to the above solution and was turned upside down to mix. Beads were collected for 1 minute using a magnet and supernatant was removed. 100 μl of a buffer solution 1 (PBS with pH7.4 including 0.1% of BSA) was added to the above solution for re-suspension of pre-coated magnetic beads.

An experiment for extracting DNA of HBV from a blood sample using the microfluidic device 104 of FIG. 4 and the magnetic beads prepared as above was performed as follows.

Figure 15A:
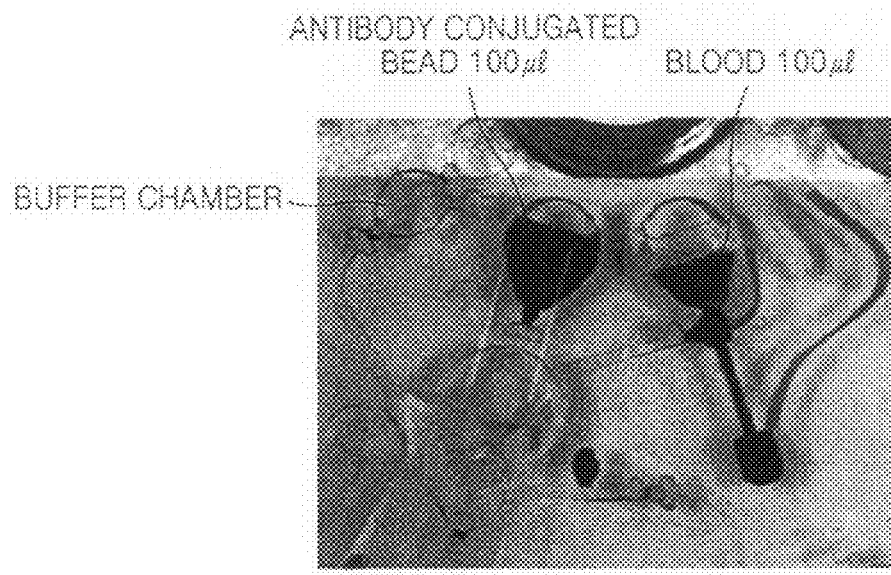
Figure 15B:
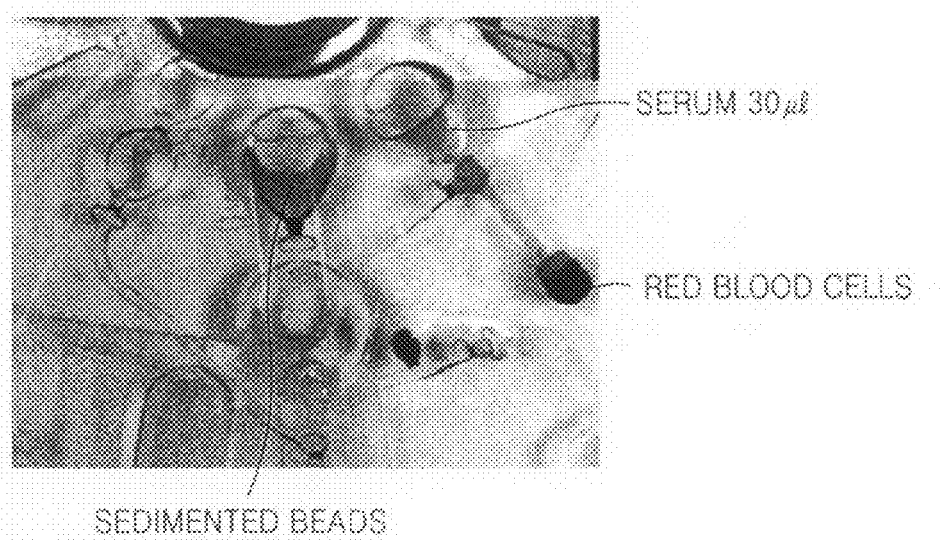
Figure 15C:
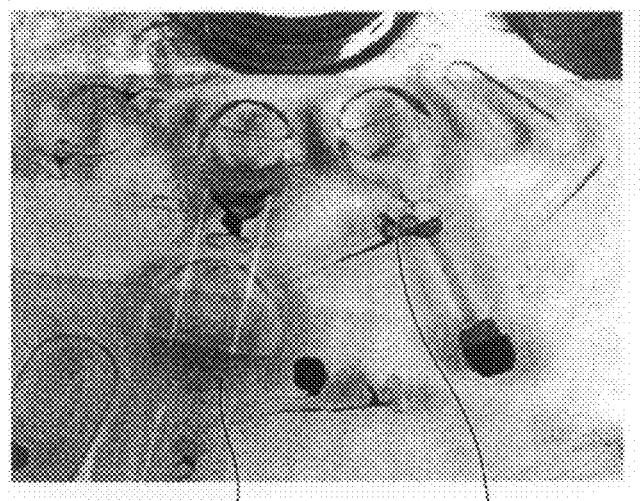

First, 100 μl of blood in which HBV was spiked, 100 μl of a magnetic beads solution in which an antibody adhered to the surface thereof, and 100 μl of a PBS buffer solution was injected to the sample chamber 11, the micro-particle chamber 13, and the buffer chamber 12, respectively (refer to FIG. 15A), and the blood sample was centrifuged using the centrifuging unit 18 by rotating the body of revolution 100 (refer to FIG. 15B).

Figure 15D:
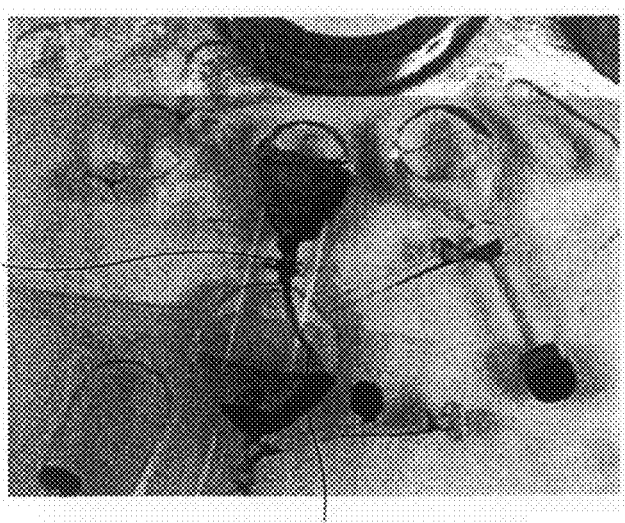

Next, while the valve 31 interposed between the centrifuging unit 18 and the mixing chamber 14 was opened to transfer 30 μl of serum separated as described above to the mixing chamber 14 (refer to FIG. 15C), the valve 33 interposed between the micro-particle chamber 13 and the mixing chamber 14 was opened to transfer a magnetic beads solution to the mixing chamber 14 (refer to FIG. 15D)

Figure 15E:
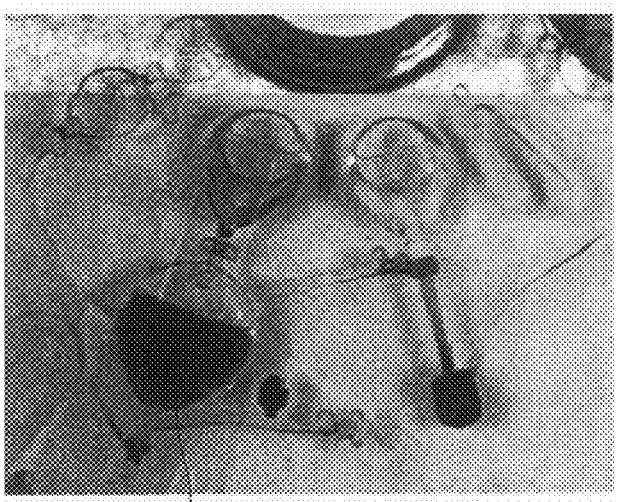
Figure 15F:
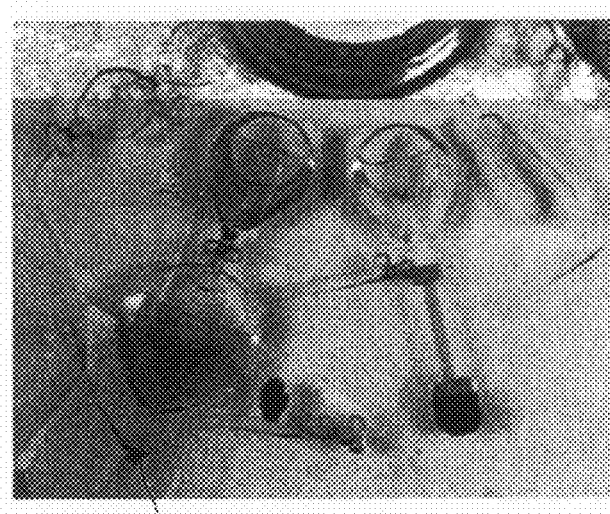
Figure 15G:
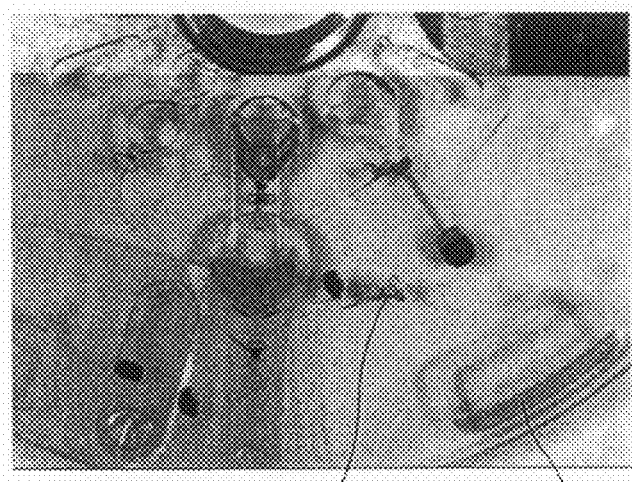

The body of revolution 100 was alternately rotated in clockwise and counter-clockwise directions for 5 minutes, and the magnetic beads were mixed with serum to capture HBV, which is the target cell, on the surface of the magnetic beads (refer to FIG. 15E). Then, the body of revolution 100 was rotated again in one direction to concentrate the magnetic beads near the outlet of the mixing chamber 14 (refer to FIG. 15F).

Figure 15H:
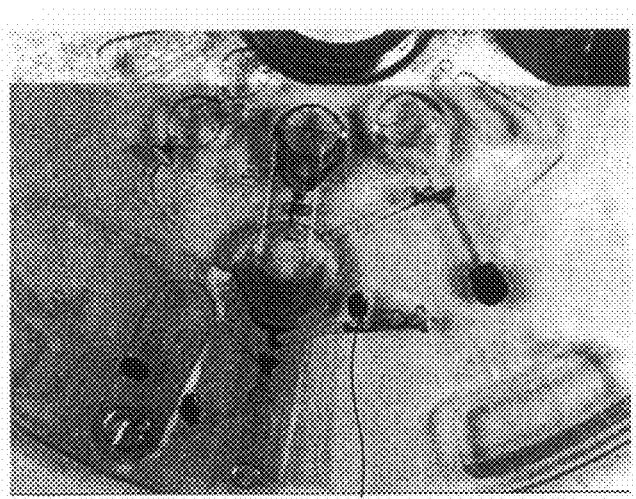
Figure 15K:
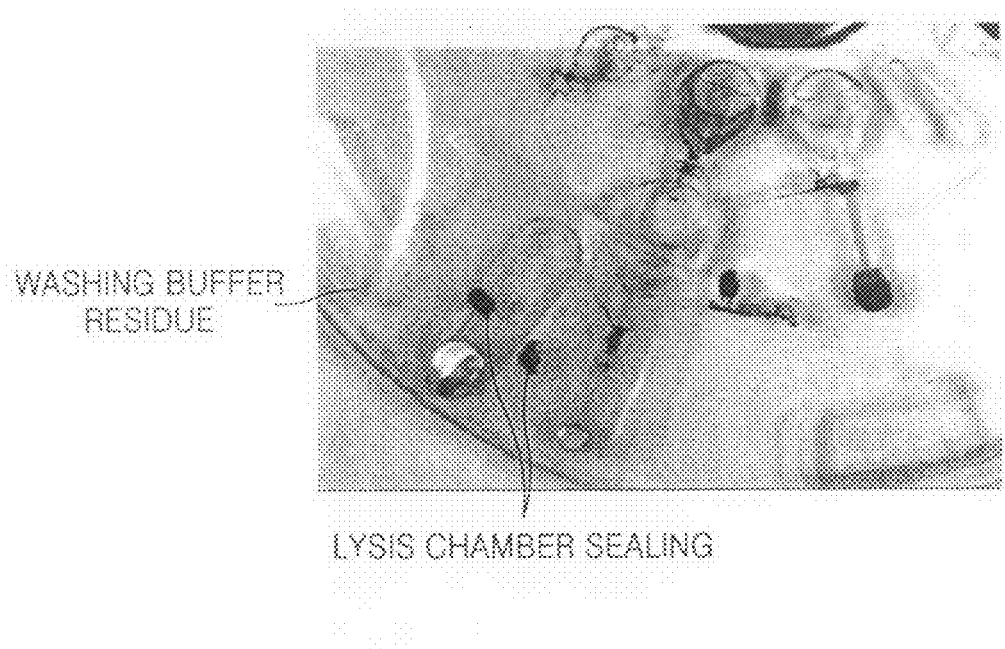

The valve 35 interposed between the mixing chamber 14 and the waste chamber 15 was opened to discharge supernatant (residual serum remaining after HBV is separated) into the waste chamber 15 (refer to FIG. 15G), and the closing valve 45, which is similar to the opening valve 35, disposed in the channel 25 was closed (refer to FIG. 15H). Then, the valve 32 interposed between the buffer chamber 12 and the mixing chamber 14 was opened to transfer the buffer solution to the mixing chamber 14 (refer to FIG. 15I).

In addition, the body of revolution 100 was alternately rotated in clockwise and counter-clockwise directions for 20 seconds, and the magnetic beads were washed using the buffer solution (FIG. 15J). Then, the outlet valve 34 disposed on the outlet of the mixing chamber 14 was opened to transfer fluid including the magnetic beads contained in the mixing chamber 14 to the cytolysis chamber 16. The fluid was transferred to the waste chamber 17 after passing through the channel 26 interposed between the mixing chamber 14 and the cytolysis chamber 16, and the cytolysis chamber 16. Here, the magnetic beads which capture HBV on the surface thereof remained in the cytolysis chamber 16 by centrifugal force and magnetic force (refer to FIG. 15K).

Next, the closing valves 46 and 47 disposed in the front and rear of the cytolysis chamber 16, respectively, were closed and a laser beam was irradiated onto the cytolysis chamber 16 to perform laser ablation. In this case, as described above, DNA was taken out while HBV adhered to the surface of the magnetic beads was disrupted, and residue generated during disrupting HBV adhered again to the surface of the magnetic beads. Therefore, DNA which is adequate for directly performing a PCR was provided from the cytolysis chamber 16 in which the cytolysis was completed.

Figure 16:
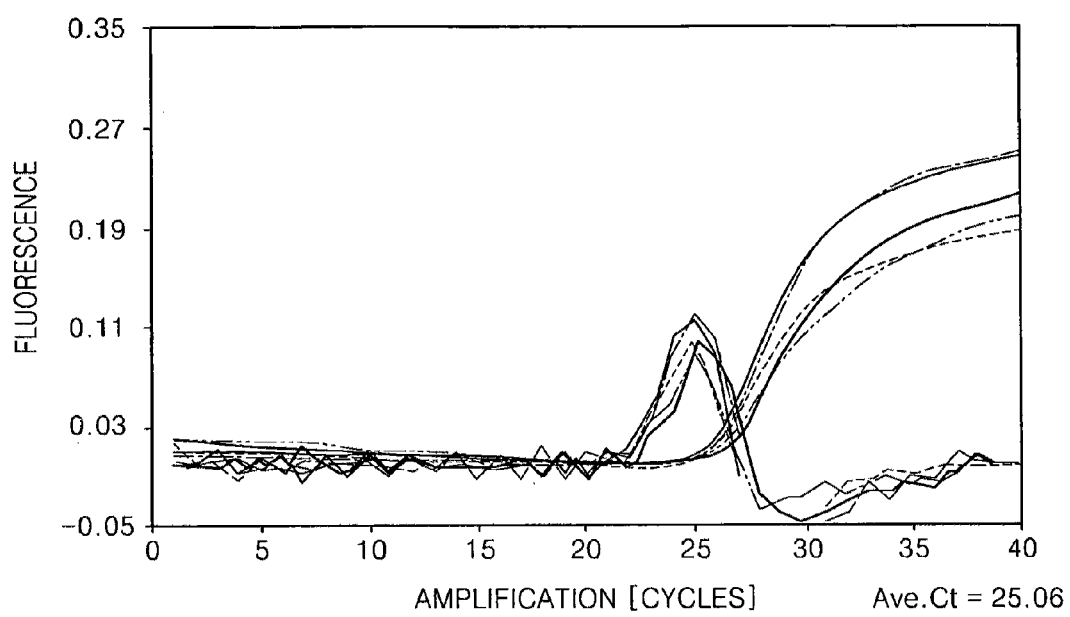
FIG. 16 is a graph illustrating a result after a real-time Polymerase Chain Reaction (PCR) is performed with DNA of Hepatitis B virus (HBV) extracted from blood samples using the microfluidic device of FIG. 4, according to another exemplary embodiment of the present invention.

FIG. 16 is a graph illustrating a result after a real-time PCR is performed with DNA of HBV extracted from the blood samples using the microfluidic device 104 of FIG. 4. Referring to FIG. 16, as the experiment illustrated in FIGS. 15A through 15K was repeated 5 times, the results after a real-time PCR was performed using resultants from each process in the experiment are illustrated. The results were stable and reasonable.

FIG. 17 is a perspective view schematically illustrating a microfluidic system 105 according to an exemplary embodiment of the present invention. The microfluidic system 105 according to the current exemplary embodiment of the present invention is prepared on the body of revolution 100, and includes one of the microfluidic devices according to the previous exemplary embodiments, a rotation operating unit 50 which rotates the body of revolution 100, and a laser light source 60 which can irradiate a laser beam onto selected regions formed on the body of revolution 100. In addition, the microfluidic system 105 may further include a light detecting unit 70 which can optically detect interim products or resultants of reactions occurring in the microfluidic device.

The laser light source 60 which can be used in laser ablation described above may include at least one laser diode, and may be any device which can meet the requirement with respect to output power and wavelength described above. In addition, when a phase-change valve including micro-particles such as heat generating particles is used in the microfluidic device, the laser light source 60 can be also used to operate the phase-change valve.

The microfluidic system 105 may include a laser light source adjusting means (not illustrated) which adjusts position or direction of the laser light source 60, and concentrates a laser beam irradiated from the laser light source 60 on a desired region on the body of revolution 100, more specifically, a region corresponding to at least one of phase-change valves 31 or the cytolysis chamber included in the microfluidic device.

An external energy source adjusting means (not illustrated) in the microfluidic system 105 of FIG. 17 can move the laser light source 60 installed facing the body of revolution 100 in a direction indicated by an arrow, in other words, a radial direction of the body of revolution 100. A mechanism of rectilinearly moving the laser light source 60 can be provided in various ways, and is obvious to those of ordinary skill in the art. Therefore, a detailed description thereof is omitted.

Meanwhile, the microfluidic system 105 includes the rotation operating unit 50 which rotates the body of revolution 100. The rotation operating unit 50 as illustrated in FIG. 17 is to settle the body of revolution 21 and to transmit a turning force. In addition, while not illustrated in FIG. 17, a motor and related parts thereof to control rotation speed and rotation angle of the body of the revolution can be included in the microfluidic system 105. A detailed description of the configuration of the rotation operating unit 50 is omitted. The laser light source 60 can irradiate a laser beam concentrically on the selected region on the body of revolution 100 of the microfluidic device with the support of the laser light source adjusting means (not illustrated) and the rotation operating unit 50.

For example, when the phase-change valve 31 which should be operated at the point of time is selected, the position of the phase-change valve 31 is known at the starting point of irradiating the laser light source 60 and A $(r,\theta)$, which is a deviation from the laser light source 60 to the phase-change valve 31, is obtained. In addition, the body of revolution 100 can be reversely rotated by $\Delta\theta$ using the rotation operating unit 50 and the laser light source 60 can be moved toward a radius direction of the body of revolution 100 by $\Delta r$ using the laser light source adjusting means (not illustrated).

The second magnet 231 can be disposed under the body of revolution 100 of the microfluidic device. The second magnet 231 may directly affect the micro-particles included in the microfluidic device when the micro-particles are magnetic beads. In addition, when the magnetic position control device (not illustrated) is disposed under the microfluidic device as illustrated in FIGS. 14A and 14B, the second magnet 231 may indirectly affect the magnetic beads through the first magnet 230. The second magnet 231 may be installed to move in a direction toward the radius of the body of revolution 100.

As described above, the microfluidic device for nucleic acid extraction according to the present invention and the microfluidic system including the microfluidic device can provide DNA that is adequate for performing a PCR, through a series of processes performed quickly in the microfluidic structure such as separating and concentrating specific cells from the biomaterial samples, and dissolving the separated cells after one simple operation of injecting samples to the microfluidic device. Therefore, a process of DNA extraction is simplified and thus, time and effort can be significantly reduced. In addition, DNA extraction of target material is possible only with a small amount of samples.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A centrifugal force-based microfluidic device for extracting a micro element from a material sample, comprising:
a body of revolution;
at least one microfluidic structure disposed in the body of revolution,
wherein the microfluidic structure comprises:
a plurality of chambers;
a plurality of channels which connect the chambers; and
a plurality of valves which are disposed in the channels to control fluid flow, and
wherein the microfluidic structure transmits fluid using centrifugal force due to rotational movement of the body of revolution; and
micro-particles contained in one of the chambers which capture a target material from the material sample flowing into the chamber,
an external energy source configured to irradiate electromagnetic waves onto the micro-particles having the target material,
wherein the microfluidic structure is configured to wash the micro-particles having the target material in the chamber, and to separate the micro element from the target material in another chamber by the electromagnetic wave.

2. The microfluidic device of claim 1, wherein the valves comprise at least one of a capillary valve, a hydrophobic valve, a mechanical valve, and a phase-change valve.

3. The microfluidic device of claim 1,
wherein the valves comprise a plurality of phase-change valves, each phase-change valve comprising a valve plug comprising:
heat generating particles; and
phase-change materials,
wherein the heat generating particles absorb radiation energy from the external energy source, and the phase-change materials melt by heat generated from the heat generating particles,
wherein the phase-change valve controls the fluid flow, the fluid passing through the channels according to a position of the valve plug in the channels.

4. The microfluidic device of claim 1, wherein the material sample is a biomaterial sample, the target material comprises at least one of a cell and a virus, and the micro element comprises at least one molecule of the cell or the virus.

5. The microfluidic device of claim 4, wherein the molecule is nucleic acid.

6. The microfluidic device of claim 4, wherein the micro-particles have surfaces modified with an antibody or a metal oxide having affinity for the cell or the virus.

7. The microfluidic device of claim 6, wherein the metal oxide comprises at least one of $Al_2O_3$, $TiO_2$, $Ta_2O_3$, $Fe_2O_3$, $Fe_3O_4$, and $HfO_2$.

8. The microfluidic device of claim 1, wherein the micro-particles comprise at least one of Fe, Ni, Cr, an Fe oxide, an Ni oxide and a Cr oxide.

9. The microfluidic device of claim 1,
wherein the body of revolution comprises two disks,
wherein one disk is stacked on the other disk, and
wherein the microfluidic structure is disposed on one surface of one of the two disks, the one surface faces the other disk.

10. A microfluidic system comprising:
a microfluidic device comprising:
a body of revolution;
at least one microfluidic structure disposed in the body of revolution,
wherein the microfluidic structure comprises:
a plurality of chambers;
a plurality of channels which connect the chambers; and
a plurality of valves which are disposed in the channels and control fluid flow, and
wherein the microfluidic structure transmits fluid using centrifugal force due to rotational movement of the body of revolution; and
micro-particles contained in one of the chambers which capture a target material from a material sample flowing into the chamber;
a rotation operating unit which rotates the body of revolution of the microfluidic device; and
an external energy source configured to irradiate electromagnetic waves onto the micro-particles having the target material,
wherein the microfluidic structure is configured to wash the micro-particles having the target material, and to separate a micro element from the target material in another chamber by the electromagnetic wave.

11. The microfluidic system of claim 10,
wherein the valves comprise a plurality of phase-change valves, each phase-change valve comprising a valve plug comprising:
heat generating particles; and
phase-change materials,
wherein the heat generating particles absorb radiation energy from the external energy source, and the phase-change materials melt by heat generated from the heat generating particles,
wherein the each phase-change valve controls the fluid flow, the fluid passing through the channels according to a position of the valve plug in the channels, and
wherein the microfluidic system further comprises an external energy source adjusting means which adjusts at least one of a position and a direction of the external energy source for the electromagnetic waves to reach a region including a phase-change valve selected among the plurality of phase-change valves.

12. The microfluidic system of claim 10, wherein the rotation operating unit comprises a motor to control rotation speed and rotation angle of the body of revolution.

13. The microfluidic system of claim 11, wherein the external energy source adjusting means comprises a rectilinearly moving means which moves the external energy source disposed facing the body of revolution in a radial direction of the body of revolution.

14. The microfluidic system of claim 10, wherein the external energy source comprises a laser light source which emits a laser beam.

15. The microfluidic system of claim 10, wherein the material sample is a biomaterial sample, the target material comprises at least one of a cell and a virus, and the micro element comprises at least one molecule of the cell or the virus.

16. The microfluidic device of claim 15, wherein the molecule is nucleic acid.

17. The microfluidic system of claim 11, wherein the micro-particles have surfaces modified with an antibody or a metal oxide having affinity for the cell or the virus.

18. The microfluidic system of claim 17, wherein the metal oxide comprises at least one of $Al_2O_3$, $TiO_2$, $Ta_2O_3$, $Fe_2O_3$, $Fe_3O_4$, and $HfO_2$.

19. The microfluidic system of claim 10, wherein the micro-particles comprise at least one of Fe, Ni, Cr, an Fe oxide, an Ni oxide and a Cr oxide.

20. The microfluidic system of claim 10,
wherein the body of revolution comprises two disks,
wherein one disk is stacked on the other disk, and
wherein the microfluidic structure is disposed on one surface of one of the two disks, the one surface faces the other disk.

* * * * *